United States Patent
Logue

(10) Patent No.: US 9,444,631 B2
(45) Date of Patent: Sep. 13, 2016

(54) CERTIFICATES FOR LOW-POWER OR LOW-MEMORY DEVICES

(71) Applicant: Google Inc., Mountain View, CA (US)

(72) Inventor: Jay D. Logue, San Jose, CA (US)

(73) Assignee: Google Inc., Mountain View, CA (US)

( * ) Notice: Subject to any disclaimer, the term of this patent is extended or adjusted under 35 U.S.C. 154(b) by 26 days.

(21) Appl. No.: 14/509,962

(22) Filed: Oct. 8, 2014

(65) Prior Publication Data
US 2016/0105288 A1    Apr. 14, 2016

(51) Int. Cl.
G06F 21/33    (2013.01)
H04L 29/06   (2006.01)
H04L 9/32    (2006.01)

(52) U.S. Cl.
CPC ............. H04L 9/3263 (2013.01); G06F 21/33 (2013.01); H04L 9/3247 (2013.01); H04L 63/0823 (2013.01)

(58) Field of Classification Search
CPC .. G06F 21/33; H04L 63/0823; H04L 9/3263
See application file for complete search history.

(56) References Cited

U.S. PATENT DOCUMENTS

| 6,675,296 B1 | 1/2004 | Boeyen | |
| 6,889,324 B1* | 5/2005 | Kanai | H04L 9/3263 380/246 |
| 2003/0041110 A1* | 2/2003 | Wenocur | G06Q 10/107 709/206 |
| 2006/0236111 A1* | 10/2006 | Bodensjo | G06F 12/1466 713/176 |
| 2009/0249074 A1* | 10/2009 | Madhavan | H04L 9/3263 713/176 |
| 2011/0016274 A1* | 1/2011 | Ohnuma | G06F 12/0223 711/115 |
| 2012/0179903 A1* | 7/2012 | Arnold | H04L 9/3247 713/155 |
| 2012/0246465 A1* | 9/2012 | Little | H04L 9/3066 713/156 |
| 2013/0145151 A1* | 6/2013 | Brown | H04L 9/3268 713/156 |
| 2013/0290712 A1 | 10/2013 | Zaverucha | |
| 2014/0317401 A1 | 10/2014 | Lee | |
| 2014/0331064 A1* | 11/2014 | Ballesteros | G06F 12/1408 713/193 |
| 2015/0213433 A1* | 7/2015 | Khan | G06Q 20/3227 705/71 |

\* cited by examiner

*Primary Examiner* — Dede Zecher
*Assistant Examiner* — Jason C Chiang

(57) ABSTRACT

Compact certificate formats that may be used in a fabric or network between devices. The compact format includes a serial number field tagged with a tag of 1, a signature algorithm field tagged with a tag of 2, an issuer field tagged with a tag of 3, an encoded version of a public key tagged with a tag of A, and a signature field tagged with a tag of C. Each field includes the respective tags and corresponding values encoded in a tag-length-value (TLV) format, and each tag value is represented in hexadecimal.

19 Claims, 8 Drawing Sheets

CERTIFICATES FOR LOW-POWER OR LOW-MEMORY DEVICES

BACKGROUND OF THE DISCLOSURE

This disclosure relates to systems, devices, methods, and related computer program products for smart buildings including the smart home. More particularly, this patent specification relates to securing communications between smart devices.

Some homes today are equipped with smart home networks to provide automated control of devices, appliances and systems, such as heating, ventilation, and air conditioning ("HVAC") systems, lighting systems, alarm systems, and home theater and entertainment systems. Smart home fabrics may include one or more networks of devices interconnected to automation functions within the home. For example, a person may input a desired temperature and a schedule indicating when the person is away from home.

In some scenarios, it may be desirable to secure communications within the networks using certificates. However, standard certificates may be relatively large compared to memory sizes and/or power availability for these smart devices. Accordingly, a smaller certificate may be desirable. However, certificates are generally not very redundant. Thus, redundancy-based compression algorithms are unlikely to produce more than a couple percentage points of compression and cannot provide an acceptable reduction of the certificates for transmission with and/or storage by the smart devices.

BRIEF SUMMARY OF THE DISCLOSURE

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure provide methods and systems for creating application-specific certificates in a compact form to reduce over-the-wire transmissions and accommodate low-memory devices. When devices communication within or across networks within a fabric, the communication may be secured using a compact format to represent a certificate that may also be expressed in a standardized format. Specifically, the compact format may be generated by a field-by-field decoding of data from the standardized format and encoding the decoded data to a compact format using encoding rules differing from the rules (e.g., distinguished encoding rules) used to generate the standardized format. The encoding rules for the compact format may constrain options offered by the standardized format for the sake of brevity. Thus, the compact format may be a shorter representation of the same certificate information with a significant savings in data used.

BRIEF DESCRIPTION OF THE DRAWINGS

Various aspects of this disclosure may be better understood upon reading the following detailed description and upon reference to the drawings in which.

DETAILED DESCRIPTION OF THE DISCLOSURE

Figure 1:
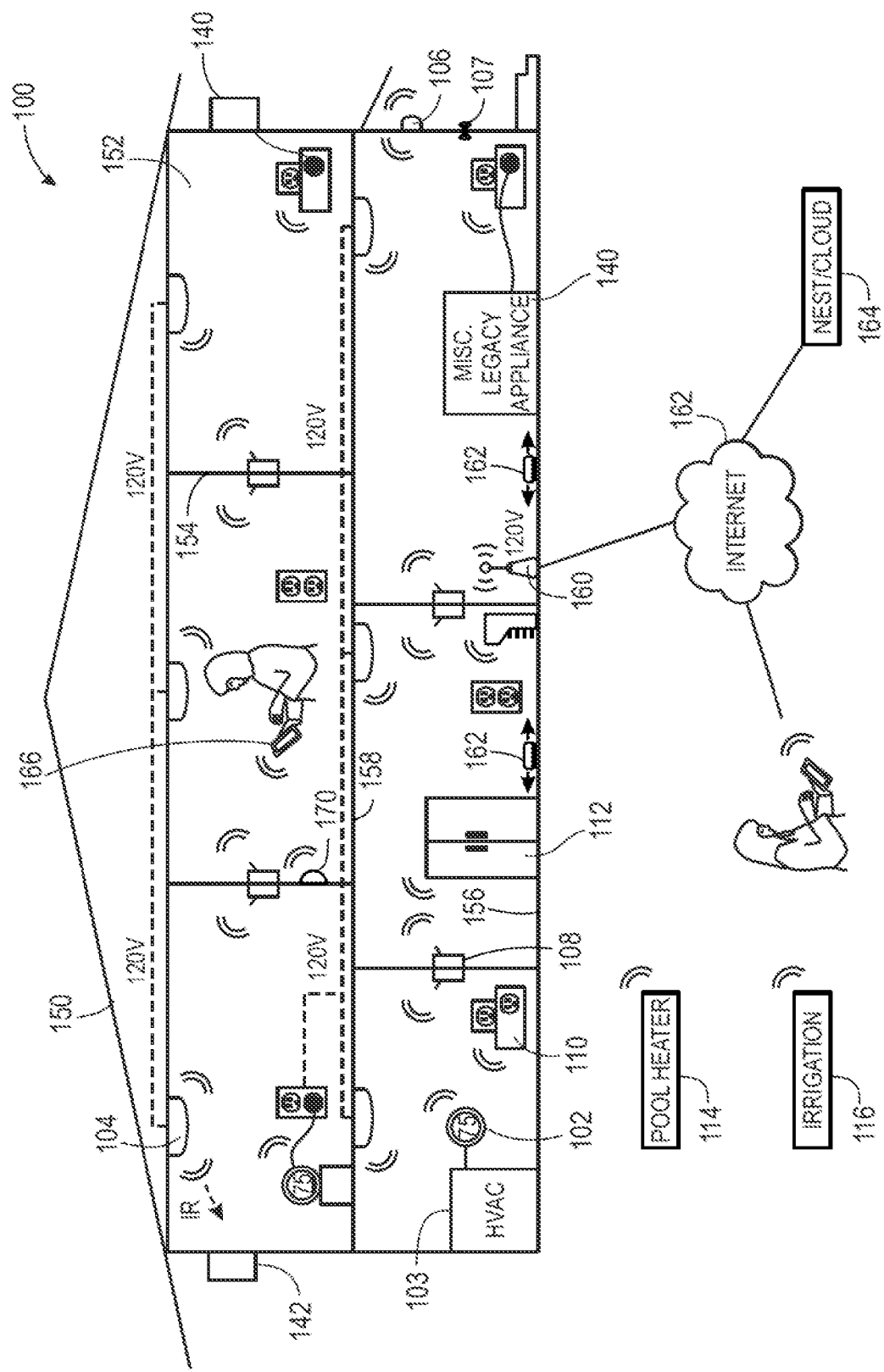
FIG. 1 illustrates an embodiment of a smart-home environment within which one or more of the devices, methods, systems, services, and/or computer program products described herein may be used, according to an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including." and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate generally to application-specific compression of a certificate format. For example, if a certificate is encoded in a format (e.g., X.509) specified by Distinguished Encoding Rules (DER), the certificate may be encoded, field by field, into a format of a smaller size as a loss-less compression. By mapping values to understood values in a more compressed format, the overall certificate length may be shortened to a length suitable for storage and/or transmission by a device with relatively low power and/or memory.

It should be appreciated that "smart home environments" may refer to smart environments or smart networks for any building type, such as single-family houses, duplexes, townhomes, multi-unit apartment buildings, hotels, retail stores, office buildings, industrial buildings, and any building that may include one or more smart devices.

It is to be further appreciated that while the terms user, customer, installer, homeowner, occupant, guest, tenant, landlord, repair person, user, and similar terms may be used to refer to a person or persons interacting with a smart device within the network via a user interface, these references are by no means to be considered as limiting the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the units, and is also one of the users of the units. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. While the identity of the person performing the action may be germane to a particular advantage provided by one or more of the embodiments—for example, the password-protected network commissioning functionality described herein may be particularly advantageous where the landlord holds the sole password and can control network additions—such identity should not be construed in the descriptions that follow as necessarily limiting the scope of the present teachings to those particular individuals having those particular identities.

Smart Network

With the foregoing in mind, FIG. 1 illustrates an example of a smart-home environment 100, also referred to as a smart network, within which one or more of the devices, methods, systems, services, and/or computer program products described further herein can be applicable. The depicted smart-home environment 100 includes a structure 150, which can include, e.g., a house, office building, garage, or mobile home. In some embodiments, the devices can also be integrated into a smart-home environment 100 that does not include an entire structure 150, such as an apartment, condominium, or office space. Further, the smart home environment can control and/or be coupled to devices outside of the actual structure 150. Indeed, several devices in the smart home environment need not physically be within the structure 150 at all. For example, a device controlling a pool heater or irrigation system can be located outside of the structure 150.

The depicted structure 150 includes multiple rooms 152, separated at least partly from each other via walls 154. The walls 154 can include interior walls or exterior walls. Each room can further include a floor 156 and a ceiling 158. Devices can be mounted on, integrated with and/or supported by a wall 154, floor 156 or ceiling 158.

In some embodiments, the smart-home environment 100 of FIG. 1 includes various devices, including intelligent, multi-sensing, network-connected devices that may integrate seamlessly with each other, with a central server, with a cloud-computing system, or some combination of these to provide any of a variety of useful smart-home objectives. The smart-home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected doorbell devices 106 (hereinafter referred to as "smart doorbells 106"), and one or more intelligent, network-connected door locks 107 (hereinafter referred to as "smart door locks 107"). According to embodiments, the smart thermostat 102 detects ambient climate characteristics (e.g., temperature and/or humidity) and controls a HVAC system 103 accordingly. The smart hazard detector 104 may detect the presence of a hazardous substance or a substance indicative of a hazardous substance (e.g., smoke, fire, or carbon monoxide). The smart doorbell 106 may detect a person's approach to or departure from a location (e.g., an outer door), control doorbell functionality, announce a person's approach or departure via audio or visual means, or control settings on a security system (e.g., to activate or deactivate the security system when occupants go and come). The smart door locks 107 may detect and toggle between a locked and unlocked condition for doors in the home, detect a person's approach to or departure from a respective door, detect whether a door is open or closed, or other suitable controls associated with a smart door lock.

In some embodiments, the smart-home environment 100 of FIG. 1 further includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

Further, in some embodiments, the smart-home environment 100 of FIG. 1 includes multiple intelligent, multi-sensing, network-connected appliances 112 (hereinafter referred to as "smart appliances 112"), such as refrigerators, stoves and/or ovens, televisions, washers, dryers, lights, stereos, intercom systems, garage-door openers, floor fans, ceiling fans, wall air conditioners, pool heaters, irrigation systems, security systems, window sensors, security systems, and so forth. According to embodiments, the network-connected appliances 112 may be made compatible with the smart-home environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 140, such as old conventional washer/dryers, refrigerators, and the like which can be controlled, albeit coarsely (ON/OFF), by virtue of the smart wall plugs 110. The smart-home environment 100 can further include a variety of partially communicating legacy appliances 142, such as infrared ("IR") controlled wall air conditioners or other IR-controlled devices, which can be controlled by IR signals provided by the smart hazard detectors 104 or the smart wall switches 108.

According to embodiments, the smart thermostats 102, the smart hazard detectors 104, the smart doorbells 106, the smart door lock 107, the smart wall switches 108, the smart wall plugs 110, and other devices of the smart-home environment 100 may be modular and may be incorporated in older and new houses. For example, in some embodiments, the devices are designed around a modular platform consisting of two basic components: a head unit and a back plate, also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors, processors, user interfaces, the batteries, and other functional components of the devices.

Many different commercial and functional possibilities for provisioning, maintenance, and upgrade are possible. For example, after years of using any particular head unit, a user may be able to buy a new version of the head unit and simply plug it into the old docking station. There are also many different versions for the head units, such as low-cost versions with few features, and then a progression of increasingly-capable versions, up to and including sophisticated head units with a large number of features. Thus, it should be appreciated that the various versions of the head units may be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a backroom or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room," "kitchen," and so forth.

The smart-home environment 100 may also include communication with devices outside of the physical home but within a proximate geographical range of the home. For example, the smart-home environment 100 may include a pool heater monitor 114 that communicates a current pool temperature to other devices within the smart-home environment 100 or receives commands for controlling the pool temperature. Similarly, the smart-home environment 100 may include an irrigation monitor 116 that communicates information regarding irrigation systems within the smart-home environment 100 and/or receives control information for controlling such irrigation systems. According to embodiments, an algorithm is provided for considering the geographic location of the smart-home environment 100, such as based on the zip code or geographic coordinates of the home. The geographic information then may be used to obtain data helpful for determining optimal times for watering. Such data may include sun location information, temperature, dew point, soil type of the land on which the home is located, etc.

By virtue of network connectivity, one or more of the smart-home devices of FIG. 1 can also enable a user to interact with the device even if the user is not proximate to the device. For example, a user can communicate with a device using a computer (e.g., a desktop computer, laptop computer, or tablet) or other portable electronic device (e.g., a smartphone) 166. A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

As discussed, users can control the smart thermostat and other smart devices in the smart-home environment 100 using a network-connected computer or portable electronic device 166. In some embodiments, the device 166 may be connected to the smart network directly or through additional networks (e.g., WiFi) that are connected to the smart network using one or more devices (e.g., an edge router). In some examples, some or all of the occupants (e.g., individuals who live in the home) can register their device 166 with the smart-home environment 100. Such registration can be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart-home environment 100 may make inferences about which individuals live in the home and are therefore occupants and which devices 166 are associated with those individuals. As such, the smart-home environment "learns" who is an occupant and permits the devices 166 associated with those individuals to control the smart devices of the home.

In some instances, guests desire to control the smart devices. For example, the smart-home environment may receive communication from an unregistered mobile device of an individual inside of the home, where said individual is not recognized as an occupant of the home. For example, a smart-home environment may receive communication from a mobile device of an individual who is known to be or who is registered as a guest or determined to be on a common network (e.g., SSID WiFi network) as the smart devices.

In some embodiments, in addition to containing processing and sensing capabilities, each of the devices 102, 104, 106, 107, 108, 110, 112, 114, 116, 162, 170 and other smart devices (collectively referred to as "the smart devices") may be capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.).

According to embodiments, all or some of the smart devices can serve as wireless or wired repeaters. For example, a first one of the smart devices can communicate with a second one of the smart device via a wireless router 160. The smart devices can further communicate with each other via a connection to a network, such as the Internet 162. Through the Internet 162, the smart devices can communicate with a central server or a cloud-computing system 164. The central server or cloud-computing system 164 can be associated with a manufacturer, support entity, or service provider associated with the device. For some embodiments, a user may be able to contact customer support using a device itself rather than needing to use other communication means such as a telephone or Internet-connected computer. Further, software updates can be automatically sent from the central server or cloud-computing system 164 to the smart devices (e.g., when available, when purchased, or at routine intervals).

As discussed below, the smart devices may be combined to create a mesh network. In some embodiments, this mesh network may include spokesman and low-power nodes in the smart-home environment 100, where some of the smart devices are "spokesman" nodes and others are "low-powered" nodes. Some of the smart devices in the smart-home environment 100 are battery powered, while others have a regular and reliable power source, such as by connecting to wiring (e.g., to 120V line voltage wires) behind the walls 154 of the smart-home environment. The smart devices that have a regular and reliable power source are referred to as "spokesman" nodes. These nodes are equipped with the capability of using any wireless protocol or manner to facilitate bidirectional communication with any of a variety of other devices in the smart-home environment 100 as well as with the central server or cloud-computing system 164. On the other hand, the devices that are battery powered are referred to as "low-power" nodes. These nodes tend to be smaller than spokesman nodes and may communicate using wireless protocols that requires very little power, such as ZigBee, 6LoWPAN, etc. Furthermore, some low-power nodes may also have a relatively low amount of memory to reduce power consumption. Thus, in some embodiments, these low-power nodes utilize streamlined messages and data formats of data (e.g., certificates). Further, some, but not all, low-power nodes are incapable of bidirectional communication. These low-power nodes send messages, but they are unable to "listen". Thus, other devices in the smart-home environment 100, such as the spokesman nodes, cannot send information to these low-power listening-only nodes.

As described, the smart devices serve as low-power and spokesman nodes to create a mesh network in the smart-home environment 100. Individual low-power nodes in the smart-home environment regularly send out messages regarding what they are sensing, and the other low-powered nodes in the smart-home environment—in addition to sending out their own messages—repeat the messages, thereby causing the messages to travel from node to node (i.e., device to device) throughout the smart-home environment 100. The spokesman nodes in the smart-home environment 100 are able to "drop down" to low-powered communication protocols to receive these messages, translate the messages to other communication protocols, and send the translated messages to other spokesman nodes and/or the central server or cloud-computing system 164. Thus, the low-powered nodes using low-power communication protocols are able to send messages across the entire smart-home environment 100 as well as over the Internet 162 to the central server or cloud-computing system 164. According to embodiments, the mesh network enables the central server or cloud-computing system 164 to regularly receive data from all of the smart devices in the home, make inferences based on the data, and send commands back to one of the smart devices to accomplish some of the smart-home objectives described herein.

As described, the spokesman nodes and some of the low-powered nodes are capable of "listening". Accordingly, users, other devices, and the central server or cloud-computing system 164 can communicate controls to the low-powered nodes. For example, a user can use the portable electronic device (e.g., a smartphone) 166 to send commands over the Internet to the central server or cloud-computing system 164, which then relays the commands to the spokesman nodes in the smart-home environment 100. The spokesman nodes drop down to a low-power protocol to communicate the commands to the low-power nodes throughout the smart-home environment, as well as to other spokesman nodes that did not receive the commands directly from the central server or cloud-computing system 164.

An example of a low-power node is a smart nightlight 170. In addition to housing a light source, the smart nightlight 170 houses an occupancy sensor, such as an ultrasonic or passive IR sensor, and an ambient light sensor, such as a photoresistor or a single-pixel sensor that measures light in the room. In some embodiments, the smart nightlight 170 is configured to activate the light source when its ambient light sensor detects that the room is dark and when its occupancy sensor detects that someone is in the room. In other embodiments, the smart nightlight 170 is simply configured to activate the light source when its ambient light sensor detects that the room is dark. Further, according to some embodiments, the smart nightlight 170 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 100 as well as over the Internet 162 to the central server or cloud-computing system 164.

Other examples of low-powered nodes include battery-operated versions of the smart hazard detectors 104. These smart hazard detectors 104 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 104 can send messages that correspond to each of the respective sensors to the other devices and the central server or cloud-computing system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore can include more power-consuming components, such as one or more communication chips capable of bidirectional communication in any variety of protocols.

In some embodiments, these low-powered and spokesman nodes (e.g., devices 102, 104, 106, 107, 108, 110, 112, and 170) may function as "tripwires" for an alarm system in the smart-home environment. For example, in the event a perpetrator circumvents detection by alarm sensors located at windows, doors, and other entry points of the smart-home environment 100, the alarm could be triggered upon receiving an occupancy, motion, heat, sound, etc. message from one or more of the low-powered and spokesman nodes in the mesh network. For example, upon receiving a message from a smart nightlight 170 indicating the presence of a person, the central server or cloud-computing system 164 or some other device could trigger an alarm, provided the alarm is armed at the time of detection. Thus, the alarm system could be enhanced by various low-powered and spokesman nodes located throughout the smart-home environment 100. In this example, a user could enhance the security of the smart-home environment 100 by buying and installing extra smart nightlights 170.

In some embodiments, the mesh network can be used to automatically turn on and off lights as a person transitions from room to room. For example, the low-powered and spokesman nodes (e.g., devices 102, 104, 106, 107, 108, 110, 112, and 170) detect the person's movement through the smart-home environment and communicate corresponding messages through the mesh network. Using the messages that indicate which rooms are occupied, the central server or cloud-computing system 164 or some other device activates and deactivates the smart wall switches 108 to automatically provide light as the person moves from room to room in the smart-home environment 100. Further, users may provide pre-configuration information that indicates which smart wall plugs 110 provide power to lamps and other light sources, such as the smart nightlight 170. Alternatively, this mapping of light sources to wall plugs 110 can be done automatically (e.g., the smart wall plugs 110 detect when a light source is plugged into it, and it sends a corresponding message to the central server or cloud-computing system 164). Using this mapping information in combination with messages that indicate which rooms are occupied, the central server or cloud-computing system 164 or some other device activates and deactivates the smart wall plugs 110 that provide power to lamps and other light sources so as to track the person's movement and provide light as the person moves from room to room.

In some embodiments, the mesh network of low-powered and spokesman nodes can be used to provide exit lighting in the event of an emergency or an emergency drill. In some instances, to facilitate this, users provide pre-configuration information that indicates exit routes in the smart-home environment 100. For example, for each room in the house, the user may provide a map of the best exit route depending on availability of the route. In some situations the route may be blocked by a hazard, and an alternate route may be illuminated and indicated, if available. It should be appreciated that instead of a user providing this information, the central server or cloud-computing system 164 or some other device could automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the smart hazard detector 104 detects smoke and activates an alarm), the central server or cloud-computing system 164 or some other device uses occupancy information obtained from the low-powered and spokesman nodes to determine which rooms are occupied and then turns on lights (e.g., nightlights 170, wall switches 108, wall plugs 110 that power lamps, etc.) along the exit routes from the occupied rooms so as to provide emergency exit lighting.

Also included and illustrated in the smart-home environment 100 of FIG. 1 are service robots 162 each configured to carry out, in an autonomous manner, any of a variety of household tasks. For some embodiments, the service robots 162 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 162 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 162 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one embodiment, the localized-thermostat service robot 162 is configured to move itself into the immediate presence (e.g., within five feet) of a particular occupant who has settled into a particular location in the home (e.g. in the dining room to eat their breakfast and read the news). The localized-thermostat service robot 162 includes a temperature sensor, a processor, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 162 proceeds to move and park itself next to the couch and keep that particular immediate space at a comfortable temperature.

Technologies by which the localized-thermostat service robot 162 (and/or the larger smart-home system of FIG. 1) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 162 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 162 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 162, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 162 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 162 can be advised by other smart-home sensors that the temperature and humidity levels are rising in the kitchen, which is nearby to the occupant's current dining room location, and responsive to this advisory the hazard detector service robot 162 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 162 having respective dedicated ones of such functionalities, by a single service robot 162 having an integration of two or more different ones of such functionalities, and/or any combinations thereof (including the ability for a single service robot 162 to have both "away" and "human facing" functionalities) without departing from the scope of the present teachings. Electrical power can be provided by virtue of rechargeable batteries or other rechargeable methods, with FIG. 1 illustrating an exemplary out-of-the-way docking station 164 to which the service robots 162 will automatically dock and recharge its batteries (if needed) during periods of inactivity. Preferably, each service robot 162 includes wireless communication components that facilitate data communications with one or more of the other wirelessly communicating smart-home sensors of FIG. 1 and/or with one or more other service robots 162 (e.g., using Wi-Fi, ZigBee, Z-Wave, 6LoWPAN, etc.), and one or more of the smart-home devices of FIG. 1 can be in communication with a remote server over the Internet. Alternatively or in conjunction therewith, each service robot 162 can be configured to communicate directly with a remote server by virtue of cellular telephone communications, satellite communications, 3G/4G network data communications, or other direct communication method.

Provided according to some embodiments are systems and methods relating to the integration of the service robot(s) 162 with home security sensors and related functionalities of the smart home system. The embodiments are particularly applicable and advantageous when applied for those service robots 162 that perform "away" functionalities or that otherwise are desirable to be active when the home is unoccupied (hereinafter "away-service robots"). Included in the embodiments are methods and systems for ensuring that home security systems, intrusion detection systems, and/or occupancy-sensitive environmental control systems (for example, occupancy-sensitive automated setback thermostats that enter into a lower-energy-using condition when the home is unoccupied) are not erroneously triggered by the away-service robots.

Provided according to some embodiments is a home automation and security system (e.g., as shown in FIG. 1) that is remotely monitored by a monitoring service by virtue of automated systems (e.g., cloud-based servers or other central servers, hereinafter "central server") that are in data communications with one or more network-connected elements of the home automation and security system. The away-service robots are configured to be in operative data communication with the central server, and are configured such that they remain in a non-away-service state (e.g., a dormant state at their docking station) unless permission is granted from the central server (e.g., by virtue of an "away-service-OK" message from the central server) to commence their away-service activities. An away-state determination made by the system, which can be arrived at (i) exclusively by local on-premises smart device(s) based on occupancy sensor data. (ii) exclusively by the central server based on received occupancy sensor data and/or based on received proximity-related information such as GPS coordinates from user smartphones or automobiles, or (iii) any combination of (i) and (ii) can then trigger the granting of away-service permission to the away-service robots by the central server. During the course of the away-service robot activity, during which the away-service robots may continuously detect and send their in-home location coordinates to the central server, the central server can readily filter signals from the occupancy sensing devices to distinguish between the away-service robot activity versus any unexpected intrusion activity, thereby avoiding a false intrusion alarm condition while also ensuring that the home is secure. Alternatively or in conjunction therewith, the central server may provide filtering data (such as an expected occupancy-sensing profile triggered by the away-service robots) to the occupancy sensing nodes or associated processing nodes of the smart home, such that the filtering is performed at the local level. Although somewhat less secure, it would also be within the scope of the present teachings for the central server to temporarily disable the occupancy sensing equipment for the duration of the away-service robot activity.

According to another embodiment, functionality similar to that of the central server in the above example can be performed by an on-site computing device such as a dedicated server computer, a "master" home automation console or panel, or as an adjunct function of one or more of the smart-home devices of FIG. 1. In such an embodiment, there would be no dependency on a remote service provider to provide the "away-service-OK" permission to the away-service robots and the false-alarm-avoidance filtering service or filter information for the sensed intrusion detection signals.

According to other embodiments, there are provided methods and systems for implementing away-service robot functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" setpoint temperature). According to one embodiment, the away-service robots are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some embodiments, the notification signals sent by the away-service robots to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, wherein any particular away-service robot requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s), on the other hand, as it is only required that there is the described standard one-way notification protocol or the described standard two-way request/permission protocol to be agreed upon by the respective suppliers.

According to still other embodiments, the activity sensing systems are configured to detect sounds, vibrations. RF emissions, or other detectable environmental signals or "signatures" that are intrinsically associated with the away-service activity of each away-service robot, and are further configured such that no disturbance-detected outcome will occur for as long as that particular detectable signal or environmental "signature" is detected. By way of example, a particular kind of vacuum-cleaning away-service robot may emit a specific sound or RF signature. For one embodiment, the away-service environmental signatures for each of multiple known away-service robots are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots for that home during that training session, and thereafter will suppress disturbance-detected outcomes for intervals in which those environmental signatures are heard.

For still another embodiment, which is particularly useful when the activity sensing system is associated with occupancy-sensitive environmental control equipment rather than a home security system, the activity sensing system is configured to automatically learn the environmental signatures for the away-service robots by virtue of automatically performing correlations over time between detected environmental signatures and detected occupancy activity. By way of example, for one embodiment an intelligent automated nonoccupancy-triggered setback thermostat such as the Nest Learning Thermostat can be configured to constantly monitor for audible and RF activity as well as to perform infrared-based occupancy detection. In particular view of the fact that the environmental signature of the away-service robot will remain relatively constant from event to event, and in view of the fact that the away-service events will likely either (a) themselves be triggered by some sort of nonoccupancy condition as measured by the away-service robots themselves, or (b) occur at regular times of day, there will be patterns in the collected data by which the events themselves will become apparent and for which the environmental signatures can be readily learned. Generally speaking, for this automatic-learning embodiment in which the environmental signatures of the away-service robots are automatically learned without requiring user interaction, it is more preferable that a certain number of false triggers be tolerable over the course of the learning process. Accordingly, this automatic-learning embodiment is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious consequences, whereas false home security alarms may have more serious consequences.

According to embodiments, technologies including the sensors of the smart devices located in the mesh network of the smart-home environment in combination with rules-based inference engines or artificial intelligence provided at the central server or cloud-computing system 164 are used to provide a personal "smart alarm clock" for individual occupants of the home. For example, user-occupants can communicate with the central server or cloud-computing system 164 via their mobile devices 166 to access an interface for the smart alarm clock. There, occupants can turn on their "smart alarm clock" and input a wake time for the next day and/or for additional days. In some embodiments, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time.

According to embodiments, the smart device in the smart-home environment 100 that happens to be closest to the occupant when the occupant falls asleep will be the device that transmits messages regarding when the occupant stopped moving, from which the central server or cloud-computing system 164 will make inferences about where and when the occupant prefers to sleep. This closest smart device will as be the device that sounds the alarm to wake the occupant. In this manner, the "smart alarm clock" will follow the occupant throughout the house, by tracking the individual occupants based on their "unique signature", which is determined based on data obtained from sensors located in the smart devices. For example, the sensors include ultrasonic sensors, passive IR sensors, and the like. The unique signature is based on a combination of walking gait, patterns of movement, voice, height, size, etc. It should be appreciated that facial recognition may also be used.

According to an embodiment, the wake times associated with the "smart alarm clock" are used by the smart thermostat 102 to control the HVAC in an efficient manner so as to pre-heat or cool the house to the occupant's desired "sleeping" and "awake" temperature settings. The preferred settings can be learned over time, such as by observing which temperature the occupant sets the thermostat to before going to sleep and which temperature the occupant sets the thermostat to upon waking up.

According to an embodiment, a device is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 102 so as to pre-heat or cool the home to the occupant's desired setting before the occupant wakes up. Further, these predictions can be used to set the "smart alarm clock" for the occupant, to turn on lights, etc.

According to embodiments, technologies including the sensors of the smart devices located throughout the smart-home environment in combination with rules-based inference engines or artificial intelligence provided at the central server or cloud-computing system 164 are used to detect or monitor the progress of Alzheimer's disease. For example, the unique signatures of the occupants are used to track the individual occupants' movement throughout the smart-home environment 100. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to embodiments, the remote servers or cloud computing architectures 164 analyze the person's migration data collected by the mesh network of the smart-home environment to identify such patterns.

Figure 2:
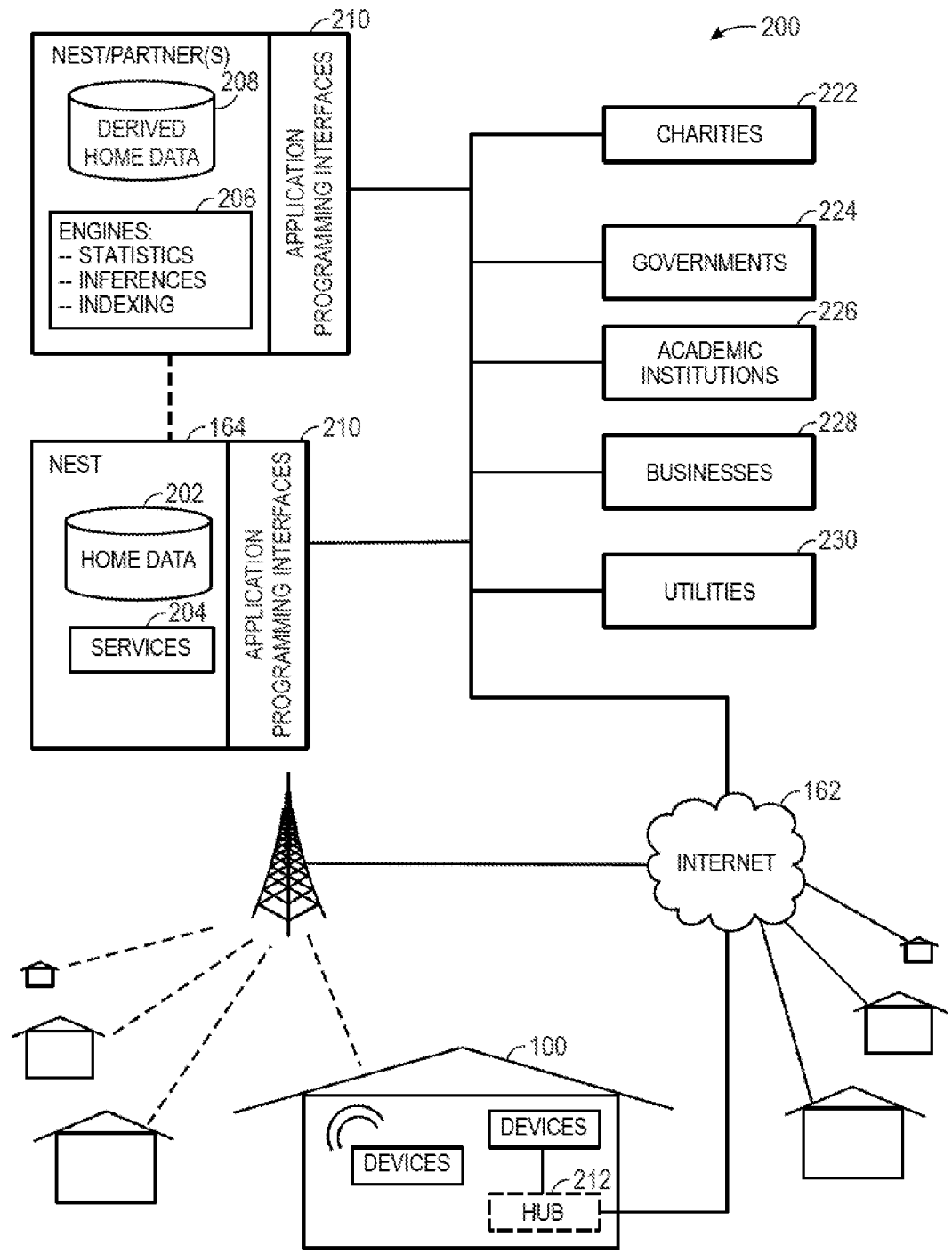
FIG. 2 illustrates a network-level view of an extensible devices and services platform with which the smart-home environment of FIG. 1 can be integrated, according to an embodiment.

FIG. 2 illustrates a network-level view of an extensible devices and services platform 200 with which multiple smart-home environments, such as the smart-home environment 100 of FIG. 1, can be integrated. The extensible devices and services platform 200 includes remote servers or cloud computing architectures 164. Each of the smart devices can communicate with the remote servers or cloud computing architectures 164. For example, a connection to the Internet 162 can be established either directly (for example, using 3G/4G connectivity to a wireless carrier), through a wireless mesh network (which can be a scheme ranging from a simple wireless router, for example, up to and including an intelligent, dedicated whole-home control node), or through any combination thereof. The smart network may couple to the Internet 162 using a hub 212.

Although in some examples provided herein, the devices and services platform 200 communicates with and collects data from the smart devices of smart-home environment 100 of FIG. 1, it should be appreciated that the devices and services platform 200 may communicate with and collect data from multiple smart-home environments across the world. For example, the central server or cloud-computing system 164 can collect home data 202 from the devices of one or more smart-home environments, where the devices can routinely transmit home data or can transmit home data in specific instances (e.g., when a device queries the home data 202). Thus, the devices and services platform 200 may routinely collect data from homes across the world. As described, the collected home data 202 includes, for example, power consumption data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, etc.

The central server or cloud-computing architecture 164 can further provide one or more services 204. The services 204 can include, e.g., software updates, customer support, sensor data collection % logging, weather information, account information, remote access, remote or distributed control, or use suggestions (e.g., based on collected home data 202 to improve performance, reduce utility cost, etc.). Data associated with the services 204 can be stored at the central server or cloud-computing system 164 and the central server or the cloud-computing system 164 can retrieve and transmit the data at an appropriate time (e.g., at regular intervals, upon receiving a request from a user, etc.).

As illustrated in FIG. 2, an embodiment of the extensible devices and services platform 200 includes a processing engine 206, which can be concentrated at a single server or distributed among several different computing entities without limitation. The processing engine 206 can include engines configured to receive data from devices of smart-home environments (e.g., via the Internet or a hubbed network), to index the data, to analyze the data and/or to generate statistics based on the analysis or as part of the analysis. The analyzed data can be stored as derived home data 208.

Results of the analysis or statistics can thereafter be transmitted back to the device that provided home data used to derive the results, to other devices, to a server providing a webpage to a user of the device, or to other non-device entities. For example, use statistics, use statistics relative to use of other devices, use patterns, and/or statistics summarizing sensor readings can be generated by the processing engine 206 and transmitted. The results or statistics can be provided via the Internet 162. In this manner, the processing engine 206 can be configured and programmed to derive a variety of useful information from the home data 202. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 206 can generate statistics about device usage across a population of devices and send the statistics to device users, service providers or other entities (e.g., that have requested or may have provided monetary compensation for the statistics).

According to some embodiments, the home data 202, the derived home data 208, and/or another data can be used to create "automated neighborhood safety networks." For example, in the event the central server or cloud-computing architecture 164 receives data indicating that a particular home has been broken into, is experiencing a fire, or some other type of emergency event, an alarm is sent to other smart homes in the "neighborhood." In some instances, the central server or cloud-computing architecture 164 automatically identifies smart homes within a radius of the home experiencing the emergency and sends an alarm to the identified homes. In such instances, the other homes in the "neighborhood" do not have to sign up for or register to be a part of a safety network, but instead are notified of an emergency based on their proximity to the location of the emergency. This creates robust and evolving neighborhood security watch networks, such that if one person's home is getting broken into, an alarm can be sent to nearby homes, such as by audio announcements via the smart devices located in those homes. Additionally or alternatively, if a neighbor's hazard detector detect smoke, neighboring houses may activate irrigation systems to reduce likelihood of a spread of fire. It should be appreciated that this safety network can be an opt-in service and that, in addition to or instead of the central server or cloud-computing architecture 164 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some embodiments, sound, vibration, and/or motion sensing components of the smart devices are used to detect sound, vibration, and/or motion created by running water. Based on the detected sound, vibration, and/or motion, the central server or cloud-computing architecture 164 makes inferences about water usage in the home and provides related services. For example, the central server or cloud-computing architecture 164 can nm programs/algorithms that recognize what water sounds like and when it is running in the home. According to one embodiment, to map the various water sources of the home, upon detecting running water, the central server or cloud-computing architecture 164 sends a message an occupant's mobile device asking if water is currently running or if water has been recently run in the home and, if so, which room and which water-consumption appliance (e.g., sink, shower, toilet, etc.) was the source of the water. This enables the central server or cloud-computing architecture 164 to determine the "signature" or "fingerprint" of each water source in the home. This is sometimes referred to herein as "audio fingerprinting water usage."

In one illustrative example, the central server or cloud-computing architecture 164 creates a signature for the toilet in the master bathroom, and whenever that toilet is flushed, the central server or cloud-computing architecture 164 will know that the water usage at that time is associated with that toilet. Thus, the central server or cloud-computing architecture 164 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices are used to detect sound, vibration, and/or motion created by mice and other rodents as well as by termites, cockroaches, and other insects (collectively referred to as "pests"). Based on the detected sound, vibration, and/or motion, the central server or cloud-computing architecture 164 makes inferences about pest-detection in the home and provides related services. For example, the central server or cloud-computing architecture 164 can run programs/algorithms that recognize what certain pests sound like, how they move, and/or the vibration they create, individually and/or collectively. According to one embodiment, the central server or cloud-computing architecture 164 can determine the "signatures" of particular types of pests.

For example, in the event the central server or cloud-computing architecture 164 detects sounds that may be associated with pests, it notifies the occupants of such sounds and suggests hiring a pest control company. If it is confirmed that pests are indeed present, the occupants input to the central server or cloud-computing architecture 164 confirms that its detection was correct, along with details regarding the identified pests, such as name, type, description, location, quantity, etc. This enables the central server or cloud-computing architecture 164 to "rune" itself for better detection and create "signatures" or "fingerprints" for specific types of pests. For example, the central server or cloud-computing architecture 164 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing architecture 164 can make inferences that nearby homes may also have such problems or may be susceptible to having such problems, and it can send warning messages to those homes to help facilitate early detection and prevention.

In some embodiments, to encourage innovation and research and to increase products and services available to users, the devices and services platform 200 expose a range of application programming interfaces (APIs) 210 to third parties, such as charities 222, governmental entities 224 (e.g., the Food and Drug Administration or the Environmental Protection Agency), academic institutions 226 (e.g., university researchers), businesses 228 (e.g., providing device warranties or service to related equipment, targeting advertisements based on home data), utility companies 230, and other third parties. The APIs 210 may be coupled to and permit third-party systems to communicate with the central server or the cloud-computing system 164, including the services 204, the processing engine 206, the home data 202, and the derived home data 208. For example, APIs 210 may allow applications executed by the third parties to initiate specific data processing tasks that are executed by the central server or the cloud-computing system 164, as well as to receive dynamic updates to the home data 202 and the derived home data 208.

For example, third parties can develop programs and/or applications, such as web or mobile apps that integrate with the central server or the cloud-computing system 164 to provide services and information to users. Such programs and application may be, for example, designed to help users reduce energy consumption, to preemptively service faulty equipment, to prepare for high service demands, to track past service performance, etc., or to perform any of a variety of beneficial functions or tasks now known or hereinafter developed.

According to some embodiments, third-party applications make inferences from the home data 202 and the derived home data 208, such inferences may include when are occupants home, when are they sleeping, when are they cooking, when are they in the den watching television, and when do they shower. The answers to these questions may help third-parties benefit consumers by providing them with interesting information, products and services as well as with providing them with targeted advertisements.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company.

Figure 3:
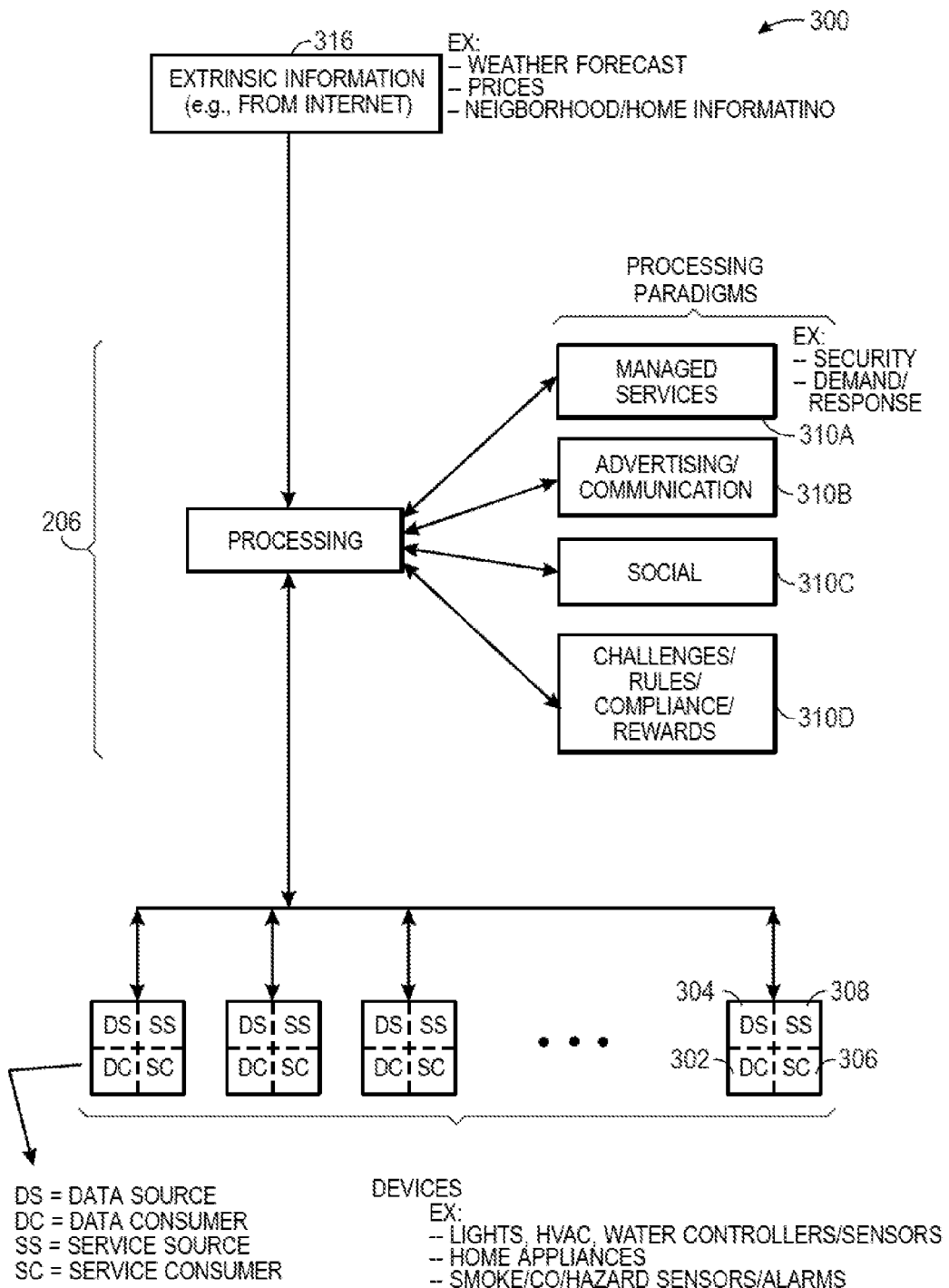
FIG. 3 illustrates a functional view of the extensible devices and services platform of FIG. 2, with reference to a processing engine as well as devices of the smart-home environment, according to an embodiment.

FIG. 3 illustrates a functional view 300 of the extensible devices and services platform 200 of FIG. 2, with particular reference to the processing engine 206 as well as devices, such as those of the smart-home environment 100 of FIG. 1. Even though devices situated in smart-home environments may have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform 200 can also be configured to harness the large amount of data that is flowing out of these devices. In addition to enhancing or optimizing the actual operation of the devices themselves with respect to their immediate functions, the extensible devices and services platform 200 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 3 shows processing engine 206 as including a number of paradigms 310. Processing engine 206 can include a managed services paradigm 310a that monitors and manages primary or secondary device functions. The device functions can include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 206 can further include an advertising/communication paradigm 310b that estimates characteristics (e.g., demographic information), desires and/or products of interest of a user based on device usage. Services, promotions, products or upgrades can then be offered or automatically provided to the user. Processing engine 206 can further include a social paradigm 310c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

The processing engine 206 can include a challenges/rules/compliance/rewards paradigm 310d that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those that successfully complete the challenge are rewarded, such as by coupons, virtual currency, status, etc. Regarding compliance, an example involves a rental-property owner making a rule that no renters are permitted to access certain owner's rooms. The devices in the room having occupancy sensors could send updates to the owner when the room is accessed.

The processing engine 206 may integrate or otherwise utilize extrinsic information 316 from extrinsic sources to improve the functioning of one or more processing paradigms. Extrinsic information 316 can be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits may be brought about by, and fit within the scope of, the described extensible devices and services platform 200, ranging from the ordinary to the profound. Thus, in one "ordinary" example, each bedroom of the smart-home environment 100 can be provided with a smart wall switch 108, a smart wall plug 110, and/or smart hazard detectors 104, all or some of which include an occupancy sensor, wherein the occupancy sensor is also capable of inferring (e.g., by virtue of motion detection, facial recognition, audible sound patterns, etc.) whether the occupant is asleep or awake. If a fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same bedroom occupancy data that is being used for fire safety can also be "repurposed" by the processing engine 206 in the context of a social paradigm of neighborhood child development and education. Thus, for example, the same bedroom occupancy and motion data discussed in the "ordinary" example can be collected and made available (properly anonymized) for processing in which the sleep patterns of schoolchildren in a particular ZIP code can be identified and tracked. Localized variations in the sleeping patterns of the schoolchildren may be identified and correlated, for example, to different nutrition programs in local schools.

Smart Devices

Figure 4:
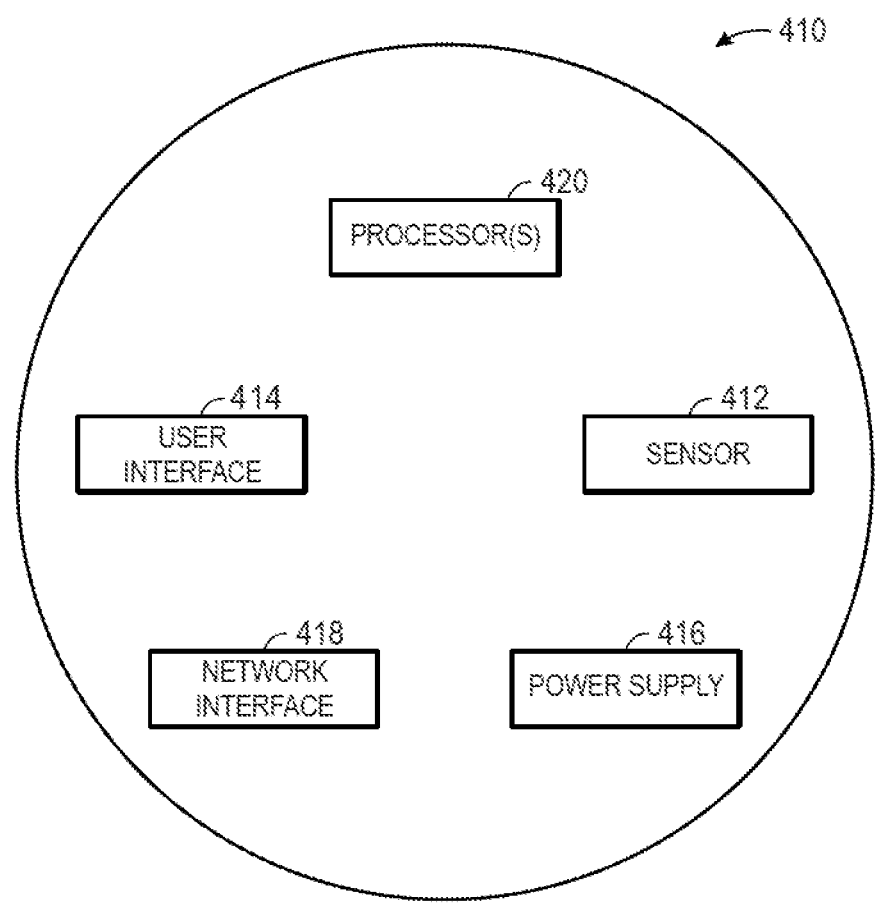
FIG. 4 illustrates block diagram view of a smart device that may securely communicate with other smart devices within the smart-home environment, according to an embodiment.

By way of introduction, FIG. 4 illustrates an example of a device 410 (e.g., thermostat and/or hazard detector) that may that may communicate with other like devices within a home environment. In one embodiment, the device 410 may include one or more sensors 412, a user interface component 14, a power supply 416 (e.g., including a power connection and/or battery), a network interface 418, a processor 420, and the like. Particular sensors 412, user interface components 414, and power-supply configurations may be the same or similar within each device 410. However, it should be noted that in some embodiments, each device 410 may include particular sensors 412, user interface components 414, power-supply configurations, and the like based on a device type or model.

The sensors 412, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals, or fields, or the like. As such, the sensors 412 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s), radiofrequency identification detector(s) and/or other suitable sensors. While FIG. 4 illustrates an embodiment with a single sensor, many embodiments may include multiple sensors. In some instances, the device 410 may includes one or more primary sensors and one or more secondary sensors. Here, the primary sensor(s) may sense data central to the core operation of the device (e.g., sensing a temperature in a thermostat or sensing smoke in a smoke detector), while the secondary sensor(s) may sense other types of data (e.g., motion, light or sound), which can be used for energy-efficiency objectives, security objectives, safety objectives, and/or smart-operation objectives.

One or more user interface components 414 in the device 410 may receive input from the user and/or present information to the user. The received input may be used to determine one or more settings. In certain embodiments, the user interface components may include a mechanical or virtual component that responds to the user's motion. For example, the user may mechanically move a sliding component (e.g., along a vertical or horizontal track) or rotate a rotatable ring (e.g., along a circular track), or move an object (e.g., finger) across/onto a touchpad of the device 410. Such motions may correspond to a setting adjustment, which can be determined based on an absolute position of a user interface component 414 or based on a displacement of a user interface components 414 (e.g., adjusting a set point temperature by 1 degree F. for every 10° rotation of a rotatable-ring component). Physically and virtually movable user interface components can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user interface component may be associated with a magnitude of a setting adjustment, such that a user may dramatically alter a setting with a large movement or finely tune a setting with s small movement.

The user interface components 414 may also include one or more buttons (e.g., up and down buttons), a keypad, a number pad, a switch, a microphone, and/or a camera (e.g., to detect gestures). In some embodiments, the user interface component 414 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user interface component 414 may include a camera that may detect gestures (e.g., to indicate that a power or alarm state of a device is to be changed). In some instances, the device 410 may have one primary input component, which may be used to set a plurality of types of settings. The user interface components 414 may also be configured to present information to a user via, e.g., a visual display (e.g., a thin-film-transistor display or organic light-emitting-diode display) and/or an audio speaker.

The power-supply component 16 may include a power connection and/or a local battery. For example, the power connection may connect the device 410 to a power source such as a line voltage source. In some instances, an AC power source can be used to repeatedly charge a (e.g., rechargeable) local battery, such that the battery may be used later to supply power to the device 410 when the AC power source is not available.

The network interface 418 may include a component that enables the device 410 to communicate between devices. In one embodiment, the network interface 418 may communicate using an efficient network layer as part of its Open Systems Interconnection (OSI) model. In one embodiment, the efficient network layer, which will be described in more detail below with reference to FIG. 5, may enable the device 410 to wirelessly communicate IPv6-type data or traffic using a RIPng routing mechanism and a DTLS security scheme. As such, the network interface 418 may include a wireless card or some other transceiver connection.

The processor 420 may support one or more of a variety of different device functionalities. As such, the processor 420 may include one or more processors configured and programmed to carry out and/or cause to be carried out one or more of the functionalities described herein. In one embodiment, the processor 420 may include general-purpose processors carrying out computer code stored in local memory (e.g., flash memory, hard drive, random access memory), special-purpose processors or application-specific integrated circuits, combinations thereof, and/or using other types of hardware/firmware/software processing platforms. Further, the processor 420 may be implemented as localized versions or counterparts of algorithms carried out or governed remotely by central servers or cloud-based systems, such as by virtue of running a Java virtual machine (JVM) that executes instructions provided from a cloud server using Asynchronous JavaScript and XML (AJAX) or similar protocols. By way of example, the processor 420 may detect when a location (e.g., a house or room) is occupied, up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an IP address of a received signal, detecting operation of one or more devices within a time window, or the like. Moreover, the processor 420 may include image recognition technology to identify particular occupants or objects.

In certain embodiments, the processor 420 may also include a high-power processor and a low-power processor. The high-power processor may execute computational intensive operations such as operating the user interface component 414 and the like. The low-power processor, on the other hand, may manage less complex processes such as detecting a hazard or temperature from the sensor 412. In one embodiment, the low-power processor may wake or initialize the high-power processor for computationally intensive processes.

In some instances, the processor 420 may predict desirable settings and/or implement those settings. For example, based on the presence detection, the processor 420 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the processor 420 may initiate an audio or visual indicator of where the person, animal or object is or may initiate an alarm or security feature if an unrecognized person is detected under certain conditions (e.g., at night or when lights are off).

In some instances, devices may interact with each other such that events detected by a first device influences actions of a second device. For example, a first device can detect that a user has pulled into a garage (e.g., by detecting motion in the garage, detecting a change in light in the garage or detecting opening of the garage door). The first device can transmit this information to a second device via the efficient network layer, such that the second device can, e.g., adjust a home temperature setting, a light setting, a music setting, and/or a security-alarm setting. As another example, a first device can detect a user approaching a front door (e.g., by detecting motion or sudden light pattern changes). The first device may, e.g., cause a general audio or visual signal to be presented (e.g., such as sounding of a doorbell) or cause a location-specific audio or visual signal to be presented (e.g., to announce the visitor's presence within a room that a user is occupying).

By way of example, the device 410 may include a thermostat such as a Nest® Learning Thermostat. Here, the thermostat may include sensors 412 such as temperature sensors, humidity sensors, and the like such that the thermostat may determine present climate conditions within a building where the thermostat is disposed. The power-supply component 16 for the thermostat may be a local battery such that the thermostat may be placed anywhere in the building without regard to being placed in close proximity to a continuous power source. Since the thermostat may be powered using a local battery, the thermostat may minimize its energy use such that the battery is rarely replaced.

In one embodiment, the thermostat may include a circular track that may have a rotatable ring disposed thereon as the user interface component 414. As such, a user may interact with or program the thermostat using the rotatable ring such that the thermostat controls the temperature of the building by controlling a heating, ventilation, and air-conditioning (HVAC) unit or the like. In some instances, the thermostat may determine when the building may be vacant based on its programming. For instance, if the thermostat is programmed to keep the HVAC unit powered off for an extended period of time, the thermostat may determine that the building will be vacant during this period of time. Here, the thermostat may be programmed to turn off light switches or other electronic devices when it determines that the building is vacant. As such, the thermostat may use the network interface 418 to communicate with a light switch device such that it may send a signal to the light switch device when the building is determined to be vacant. In this manner, the thermostat may efficiently manage the energy use of the building.

Figure 5:
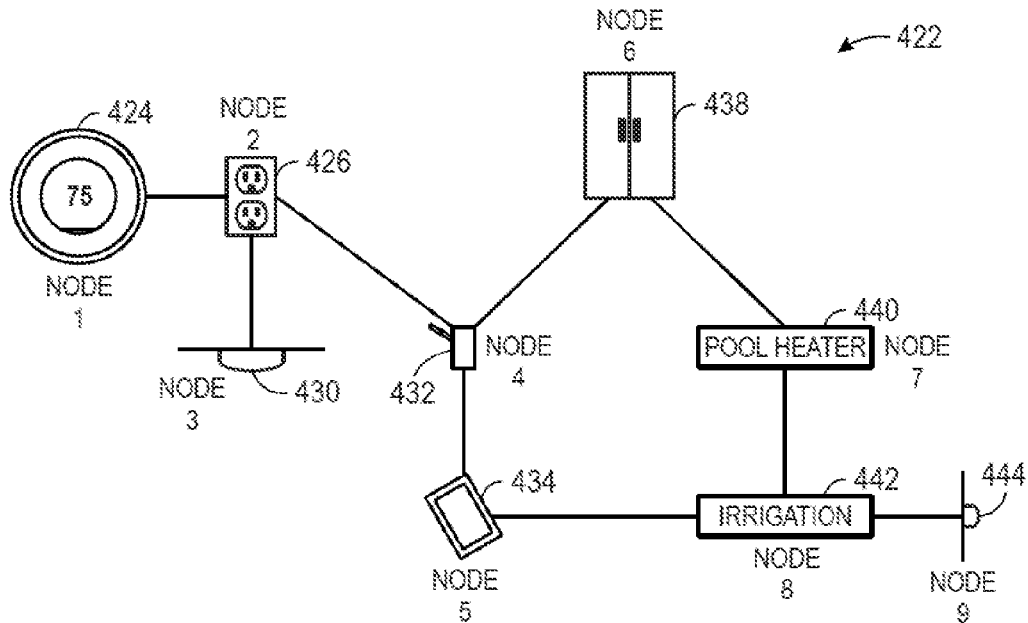
FIG. 5 illustrates a schematic view of devices interconnected within the smart-home environment, according to an embodiment.

Keeping the examples of FIGS. 1-4 in mind, FIG. 5 illustrates an example wireless mesh network 422 that may be employed to facilitate communication between some of the devices, such as those described above. As shown in FIG. 5, a thermostat 424 may have a direct wireless connection to a plug interface 426, which may be wirelessly connected to a hazard detection unit 430 and to a light switch 432. In the same manner, the light switch 432 may be wirelessly coupled to a portable electronic device 436 and an appliance 434. The appliance 438 may just be coupled to a pool heater 440 and the portable electronic device 434 may just be coupled to an irrigation system 442. The irrigation system 442 may have a wireless connection to an entryway interface device 444.

Figure 6:
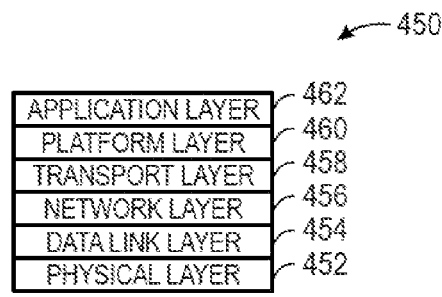
FIG. 6 illustrates a model view that illustrates functions of a communication system in layers including an application layer, a transport layer, and a network layer, according to an embodiment.

Generally, the network 422 may be part of an Open Systems Interconnection (OSI) model 450 as depicted in FIG. 6. The OSI model 450 illustrates functions of a communication system with respect to abstraction layers. That is, the OSI model may specify a networking framework or how communications between devices may be implemented. In one embodiment, the OSI model 450 may include six layers: a physical layer 452, a data link layer 454, a network layer 456, a transport layer 458, a platform layer 460, and an application layer 462. Generally, each layer in the OSI model 450 may serve the layer above it and may be served by the layer below it.

Keeping this in mind, the physical layer 452 may provide hardware specifications for devices that may communicate with each other. As such, the physical layer 452 may establish how devices may connect to each other, assist in managing how communication resources may be shared between devices, and the like.

The data link layer 454 may specify how data may be transferred between devices. Generally, the data link layer 454 may provide a way in which data packets being transmitted may be encoded and decoded into bits as part of a transmission protocol.

The network layer 456 may specify how the data being transferred to a destination node is routed. The network layer 456 may also interface with a security protocol in the application layer 462 to ensure that the integrity of the data being transferred is maintained.

The transport layer 458 may specify a transparent transfer of the data from a source node to a destination node. The transport layer 458 may also control how the transparent transfer of the data remains reliable. As such, the transport layer 458 may be used to verify that data packets intended to transfer to the destination node indeed reached the destination node. Example protocols that may be employed in the transport layer 458 may include Transmission Control Protocol (TCP) and User Datagram Protocol (UDP).

The platform layer 460 may establish connections between devices according to the protocol specified within the transport layer 458. The platform layer 460 may also translate the data packets into a form that the application layer 462 may use. The application layer 462 may support a software application that may directly interface with the user. As such, the application layer 462 may implement protocols defined by the software application. For example, the software application may provide serves such as file transfers, electronic mail, and the like.

The network layer 456 may route data between the devices 10 using a communication protocol based on Internet Protocol version 6 (IPv6). As such, each device 410 may include a 128-bit IPv6 address that may provide each device 410 with a unique address to use to identify itself over the Internet, a local network or group of networks (e.g., fabric), or the like. In some embodiments, the network layer 456 may identify a protocol (e.g., RIPng) that determines how data is routed between the devices.

Figure 7:
FIG. 7 illustrates an exchange of security information between devices, with at least one device being part of the smart-home environment, according to an embodiment.

As mentioned above, the network layer 456 may also interface with a security protocol via the application layer 462 or another security layer to manage the integrity of the data being transferred. For example, the identity or authority of devices may be verified using security information, such as security information 470 exchanged between devices 472 and 474, as illustrated in FIG. 7. The security information 470 may include certificates, public/private keys, and/or other share secrets that allow devices to authenticate with each other to create a secure connection. After the communication pathway is determined to be secure, the network layer may facilitate secure data transfers between the devices 10. However, as previously discussed, some of the devices (e.g., device 472) may be a low-power device with relatively low power and/or memory availability. Accordingly, in some embodiments, the security information 470 may include reduced size versions of one or more portions (e.g., certificate) of the security information 470. For example, in certain embodiments, the security information 470 sent between two non-low powered devices contains a first format (e.g., X.509 certificates), and the security information 470 sent to/from a low-power device may be sent in a different format. In some embodiments, the second format may be a compressed version of the first format. In some embodiments, all communications within the network/fabric may use the compressed format certificate.

Certificate Creation

Figure 8:
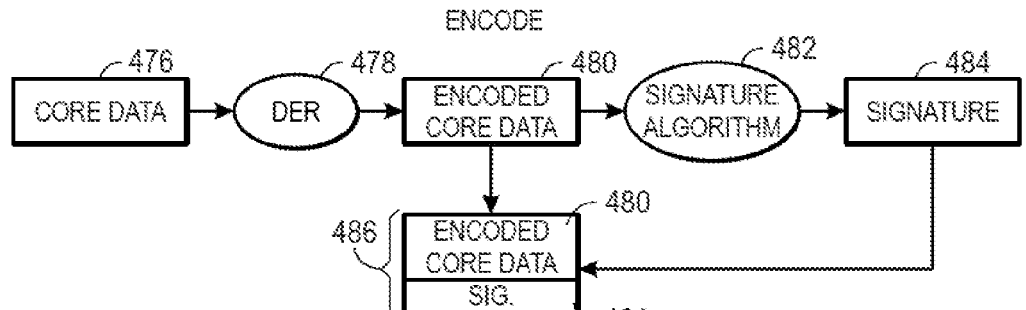
FIG. 8 illustrates an encoding scheme for a standardized-format certificate using encoding rules, according to an embodiment.

FIG. 8 illustrates a schematic view of a process for creating certificates. Core data 476 is data that is to be securely transmitted between devices within the network and/or fabric. For example, the core data 476 may pertain to certificate metadata identifying various information about the certificate, such as signing algorithm used to sign the certificate, certifying authority, identification numbers, period of validity of the certificate, and/or additional information. Using encoding rules 478, such as Distinguished Encoding Rules (DER), Basic Encoding Rules (BER), Canonical Encoding Rules (CER), and/or other encoding rules, a processing device generates encoded core data 480. In some embodiments, the processing device may be a device separate from the fabric on which the devices using the certificates reside. In some embodiments, at least a portion of the processing is performed by the devices within the fabric that use the certificates.

One or more available encoding rules are designated by a standardized set of rules (e.g., X.509, X.690, Abstract Syntax Notation One, and/or other standards) used to transmit core data 476. Thus, in some embodiments, the encoded core data 480 may be a standardized format for the certificate.

The processing device submits the encoded core data 480 to a signature algorithm 482 used to create a signature 484 that may be used to verify that communications are from an authorized device. For example, the signature algorithm 484 may include RSA, elliptical curve, or another signing algorithm that indicate the authenticity of the certificate. The encoded core data 480 and the signature 484 may combined into a single envelope 486 to enable a receiving device to verify that the communication is authentic and/or authorized. In other words, the signature 454 indicates that the signer knows the private key for the data exchange security employed.

Since, in some embodiments, the standardized encoding formats are designed for flexibility, the resulting data may be considerably long. Due to the length of the standardized formats, it may be desirable to compress the data into a new format that may be easily encoded back to the original format without loss. Furthermore, in some embodiments, this compressed signature may be checked against certificate info that is available via a certificate authority (e.g., Thawte®) or from a to-be-signed certificate. Accordingly, for the signature to remain verifiable in relation to the remote certificate info to receive the same results, in some embodiments, the compressed format is a lossless, application-specific compression format that may be reliably converted to and from the original format.

Encoding in a Compressed Format

Figure 9:
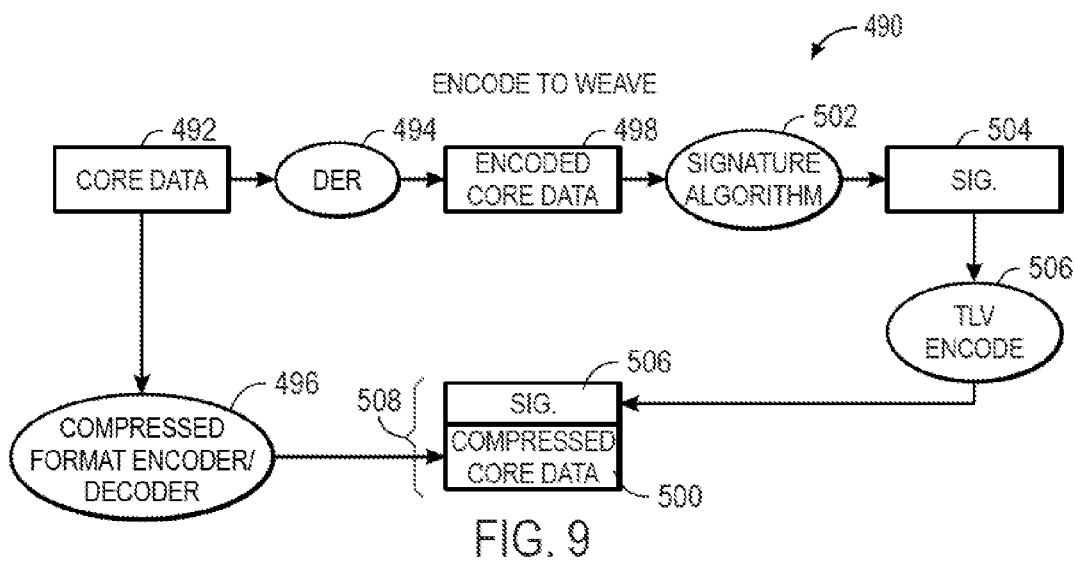
FIG. 9 illustrates an encoding scheme for a compact format certificate with a signature generated using the encoding rules of FIG. 8, according to an embodiment.

FIG. 9 illustrates a schematic view of a scheme 490 that may be employed to encode data into a compact and compressed format with a signature that is valid for a less compact, standardized certificate format. Copies of core data 492 to be transmitted is submitted to encoding rules 494 and a compressed format encoder 496 in parallel. In other words, a first copy is submitted to the encoding rules 494 in order to generate the rules encoded core data 498, similar to the encoding depicted in FIG. 8. Thus, the encoding rules 494 may include any of the encoding rules previously discussed or another suitable encoding rule set. However, in the scheme 490, a second copy is submitted to the compressed format encoder 496 to create compressed format (e.g., weave format) core data 500. The compressed format encoder 496 may include any format for compactly storing data. For example, the compressed format encoder 496 may include a tag-length-value (TLV) encoded format that includes a tag field that indicates that type of data stored, a length field that indicates a length of data, and a value field that indicates the data payload corresponding to the tag and length fields.

Furthermore, as discussed below, the compressed format encoder 496 may encode information in a field-by-field order that is common with the encoding rules 494, but the compressed core data 500 is represented with different values (e.g., tags and name-value pairs) that the compressed format encoder 496 maps between the compressed format values and the standard format.

The encoded core data 498 is submitted to a signature algorithm 502 that generates a signature 504 that may be used to authenticate a communication containing the core data 492, using a suitable signature algorithm. In some embodiments, the signature 504 may undergo further encoding to generate an encoded signature 506. For example, the signature 504 may be further encoded using a TLV encoder 506 that formats the signature in the tag-length-value format discussed above. The encoded signature 506 and the compressed core data 500 are combined into a compactly encoded security envelop 508 that enables devices to authenticate a communication/other device in a compact and secure format. In some embodiments, the combination of the signature 506 and the compressed core data 500 may be done by encoding the data (e.g., using TLV encoding). In such embodiments, the signature 504 may not be encoded again before being encoded into the security envelope 508.

Verifying the Compressed Format Certificate

Figure 10:
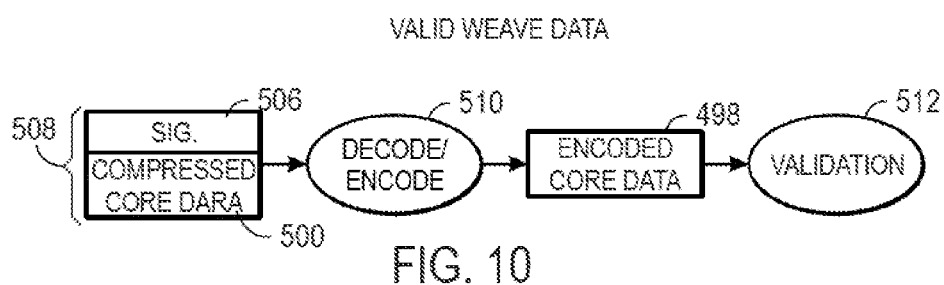
FIG. 10 illustrates a verification scheme for the compact format certificate of FIG. 9, according to an embodiment.

FIG. 10 illustrates a schematic view of a scheme for decoding and authenticating the compressed core data 500. A device (e.g., separate processing device and/or smart device in the smart-home environment) receives a compactly encoded secure message 508 that includes the signature 506 and the compressed core data 500. The compressed core data 500 is decoded using a decoder 510. In some embodiments, the decoder 510 may correspond to a portion of code that is common with the compressed format encoder 496 (e.g., Weave decoder) or other decoder included in the smart device of FIG. 9. In other words, the decoder 510 may be an decoder/encoder that is capable of both decoding and encoding the core data 492. The decoder 510 decodes the data from the compressed format into the standard format (e.g., X.509 or another ASN-1 format). The standard format data may then be validated using the signature 506.

As previously discussed, in some embodiments, the signature 506 may be encoded after generation using the signature algorithm 502. In other embodiments, the signature 506 may be the output of the signature algorithm 502 without further encoding. In embodiments, where the signature 502 is encoded in a format other than the standardized format (e.g., X.509), the signature 506 may be decoded into the standard format using a decoder (e.g., encoder/decoder) that is capable of decoding the encoded signature 506 into a different encoding to be validated 512 against the encoded core data 498 that has been decoded from the compressed format to the standard format.

Furthermore, if the compressed form of the certificate employs a data format that is used in common with other types of data exchanged by the devices in the smart-home environment (e.g. TLV), code already in the device may be at least partially used for the decoding/encoding format. Thus, the amount of code used to decode and verify a compressed certificate may be considerably less than the equivalent code used to decode and verify a higher bandwidth format certificate. In other words, the code that decodes the compressed form of the certificate (decoding of the decoder/encoder 510) is shared with existing functionality in the system. The code that encodes the core certificate data into the standardized or higher-bandwidth form (encoding of the decoder/encoder 510) is generally smaller than the code that may be used to decode the certificate were it given in the standardized or form.

Field-by-Field Encoding to Compact Format

Figure 11:
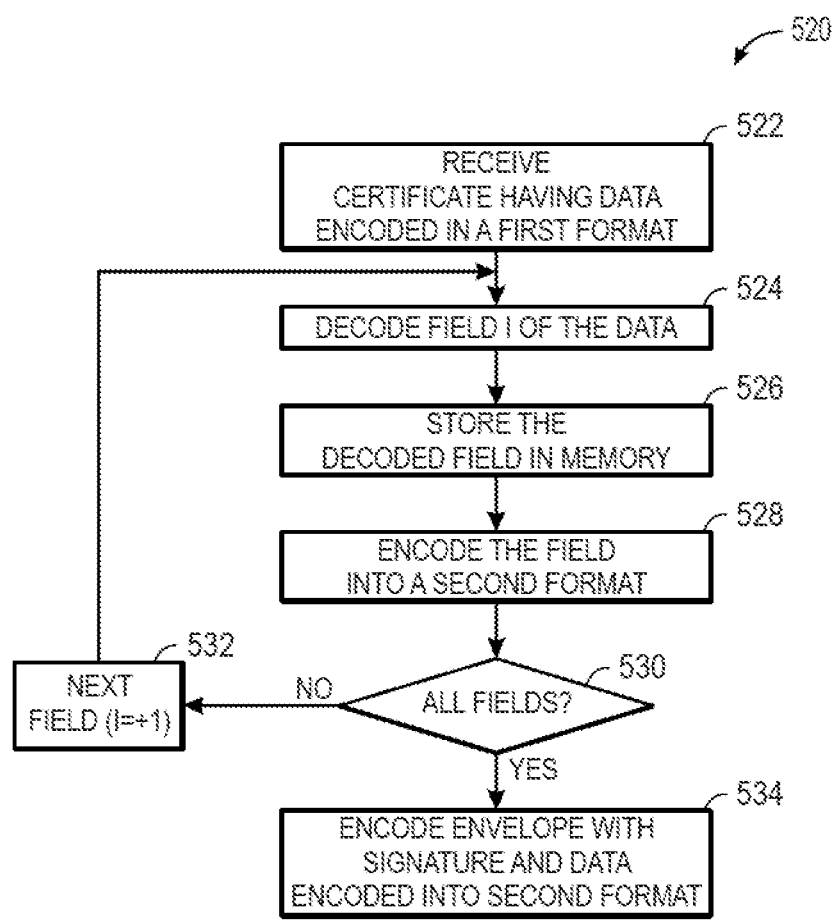
FIG. 11 illustrates a flowchart depicting a process for encoding a certificate in a compact format from a standardized format, according to an embodiment.

FIG. 11 illustrates a process 520 that may be used to format a standardized-format certificate into a compact format for use in devices with relatively low memory and/or power. In some embodiments, the compact format may be created from the standardized-format certificate using a secure environment separate from the devices. In certain embodiments, one or more devices may using the certificates may aid at least a portion of the conversions of the standardized-format certificate into the compact format. The process 520 begins when a processing device receives the certificate in the first format (e.g., standardized format, X.509) (block 522). Using standardization rules and/or security keys, the processing device decodes an actual value for a first field of the data (block 524).

Values for an example ASN.1 representation of a X.509 certificate, along with human-readable legend of values, are represented in Table 1 below:

TABLE 1

Example certificate data with human readable values

```
 0:d=0 hl=4 l= 391 cons: SEQUENCE
 4:d=1 hl=4 l= 318 cons: SEQUENCE
 8:d=2 hl=2 l=  3  cons: cont [ 0 ]
10:d=3 hl=2 l=  1  prim: INTEGER         :02
13:d=2 hl=2 l=  8  prim: INTEGER         :1048CAF2ED4F9B30
23:d=2 hl=2 l=  9  cons: SEQUENCE
25:d=3 hl=2 l=  7  prim: OBJECT          :ecdsa-with-SHA1
34:d=2 hl=2 l= 34  cons: SEQUENCE
```

TABLE 1-continued

Example certificate data with human readable values

```
 36:d=3  hl=2 l=  32 cons:  SET
 38:d=4  hl=2 l=  30 cons:  SEQUENCE
 40:d=5  hl=2 l=  10 prim:  OBJECT            :1.3.6.1.4.1.41387.1.3
 52:d=5  hl=2 l=  16 prim:  UTF8STRING          :18B430EEEE000002
 70:d=2  hl=2 l=  30 cons:  SEQUENCE
 72:d=3  hl=2 l=  13 prim:  UTCTIME           :131022004700Z
 87:d=3  hl=2 l=  13 prim:  UTCTIME           :231020004700Z
102:d=2  hl=2 l=  34 cons:  SEQUENCE
104:d=3  hl=2 l=  32 cons:  SET
106:d=4  hl=2 l=  30 cons:  SEQUENCE
108:d=5  hl=2 l=  10 prim:  OBJECT            :1.3.6.1.4.1.41387.1.1
120:d=5  hl=2 l=  16 prim:  UTF8STRING          :18B4300000000001
138:d=2  hl=2 l=  78 cons:  SEQUENCE
140:d=3  hl=2 l=  16 cons:  SEQUENCE
142:d=4  hl=2 l=   7 prim:  OBJECT            :id-ecPublicKey
151:d=4  hl=2 l=   5 prim:  OBJECT            :secp224r1
158:d=3  hl=2 l=  58 prim:  BIT STRING
218:d=2  hl=2 l= 106 cons:   cont [ 3 ]
220:d=3  hl=2 l= 104 cons:   SEQUENCE
222:d=4  hl=2 l=  12 cons:   SEQUENCE
224:d=5  hl=2 l=   3 prim:  OBJECT            :X.509v3 Basic Constraints
229:d=5  hl=2 l=   1 prim:  BOOLEAN           :255
232:d=5  hl=2 l=   2 prim:  OCTET STRING        [HEX DUMP]:3000
236:d=4  hl=2 l=  14 cons:  SEQUENCE
238:d=5  hl=2 l=   3 prim:  OBJECT            :X.509v3 Key Usage
243:d=5  hl=2 l=   1 prim:  BOOLEAN           :255
246:d=5  hl=2 l=   4 prim:  OCTET STRING        [HEX DUMP]:030205A0
252:d=4  hl=2 l=  32 cons:  SEQUENCE
254:d=5  hl=2 l=   3 prim:  OBJECT            :X.509v3 Extended Key Usage
259:d=5  hl=2 l=   1 prim:  BOOLEAN           :255
262:d=5  hl=2 l=  22 prim:  OCTET STRING        [HEX
DUMP]:301406082B0601050507030206082B06010505070301
286:d=4  hl=2 l=  17 cons:  SEQUENCE
288:d=5  hl=2 l=   3 prim:  OBJECT            :X.509v3 Subject Key Identifier
293:d=5  hl=2 l=  10 prim:  OCTET STRING        [HEX
DUMP]:04084EFF4751E4C6639B
305:d=4  hl=2 l=  19 cons:  SEQUENCE
307:d=5  hl=2 l=   3 prim:  OBJECT            :X.509v3 Authority Key Identifier
312:d=5  hl=2 l=  12 prim:  OCTET STRING        [HEX
DUMP]:300A800844E34038A9D4B5A7
326:d=1  hl=2 l=   9 cons:  SEQUENCE
328:d=2  hl=2 l=   7 prim:  OBJECT            :ecdsa-wim-SHA1
337:d=1  hl=2 l=  56 prim:  BIT STRING
```

Table 2 below represents a text translation of the X.509 certificate into human-readable values:

TABLE 2

Text translation of the example X.509 certificate.

```
Certificate:
    Data:
        Version: 3 (0x2)
        Serial Number: 1173410847642327856 (0x1048caf2ed4f9b30)
    Signature Algorithm: ecdsa-with-SHA1
        Issuer: 1.3.6.1.4.1.41387.1.3=18B430EEEE000002
        Validity
            Not Before: Oct 22 00:47:00 2013 GMT
            Not After: Oct 20 00:47:00 2023 GMT
        Subject: 1.3.6.1.4.1.41387.1.1=18B4300000000001
        Subject Public Key Info:
            Public Key Algorithm: id-ecPublicKey
                Public-Key: (224 bit)
                pub:
                    04:ef:67:9d:53:0c:99:ff:9d:72:42:b1:f9:b6:60:
                    20:8e:25:9f:35:72:f0:a3:e7:83:e6:56:14:93:f9:
                    68:45:65:8b:24:31:5e:87:8c:64:35:25:87:19:03:
                    99:cd:45:a1:24:fa:76:0b:12:9e:39:7e
                ASN1 OID: secp224r1
        X.509v3 extensions:
            X.509v3 Basic Constraints: critical
                CA:FALSE
            X.509v3 Key Usage: critical
                Digital Signature, Key Encipherment
```

TABLE 2-continued

Text translation of the example X.509 certificate.

```
    X.509v3 Extended Key Usage: critical
        TLS Web Client Authentication, TLS Web Server Authentication
    X.509v3 Subject Key Identifier:
        4E:FF:47:51:E4:C6:63:9B
    X.509v3 Authority Key Identifier:
        keyid:44:E3:40:38:A9:D4:B5:A7
Signature Algorithim: ecdsa-with-SHA1
  30:35:02:18:5d:b7:52:b0:95:13:11:71:f1:5b:64:03:80:8c:
  18:be:a1:20:f1:86:ba:45:6c:14:02:19:00:c5:0d:cf:26:02:
  80:11:8c:51:3a:bd:95:95:76:94:77:c9:46:ff:ed:c0:a0:3d:
  bd
```

As illustrated in Table 2, the X.509 certificate includes a version field, a signature algorithm field, an issuer field, a not valid before field, a not valid after field, a subject field, and other fields. In X.509 and other certificate formats, these fields are often lengthy and versatile. However, by placing constraints on the available values for the fields and generating tags as short IDs for the fields, the certificate may be represented more compactly. However, in some embodiments, to increase the ease with which the conversion between the X.509 and an application-specific format, the order of the fields may be maintained, and each field may be encoded with incrementally and independently from other fields. Moreover, in some embodiments, when the field is decoded, and the value is not one of the approved field values, the certificate may be rejected as invalid. Although the certificate may contain values that are generally permissible in the standardized format, the values are not within the constrained subset of values of the first format that are permissible for encoding into the compressed-representation format. In some embodiments, when the certificate is being sent to a device that is not a low-power device, the original non-converted certificate may be sent rather than rejecting the certificate.

Once the value of the field being processed is determined, that value is stored in memory (block 526). The value is then represented in a second format (block 528). For example, the second format may be a more compact format that uses less transmission time and/or memory when transmitted and/or stored. Table 3 below illustrates an example representation in the compact format of the example X.509 certificate above:

TABLE 3

Representation of the example X.509 format in a compact format.

```
0:4:1 : {
    1 :
        0000: 10 48 CA F2 ED 4F 9B 30              .H...O.0
    2 : 4,
    3 : <
        13 : 1780101555471515650
    >,
    4 : 443753220,
    5 : 764988420,
    6 : <
        11 : 1780100529276321793
    >,
    7 : 2,
    8 : 37,
    A:
        0000: 04 EF 67 9D 53 0C 99 FF 9D 72 42 B1 F9 B6 60 20  ..g.S....rB...
        0010: 8E 25 9F 35 72 F0 A3 E7 83 E6 56 14 93 F9 68 45  .%.5r.....V...hE
        0020: 65 8B 24 31 5E 87 8C 64 35 25 87 19 03 99 CD 45  e.$1^..d5%.....E
        0030: A1 24 FA 76 0B 12 9E 39 7E                       .$.v...9~
    83 : {
        1 : true
    },
    82 : {
        1 : true,
        2 : 5
    },
    84 : {
        1 : true,
        2 : [
            2,
            1
        ]
    },
    81 : {
        2 :
            0000: 4E FF 47 51 E4 C6 63 9B              N.GQ..c.
    },
```

TABLE 3-continued

Representation of the example X.509 format in a compact format.

```
   80 : {
      2 :
         0000: 44 E3 40 38 A9 D4 B5 A7            D.@8....
   },
   C : {
      1 :
         0000: 5D B7 52 B0 95 13 11 71 F1 5B 64 03 80 8C 18 BE   ].R....q.[d.....
         0010: A1 20 F1 86 BA 45 6C 14                           . ...El.
      2 :
         0000: 00 C5 0D CF 26 02 80 11 8C 51 3A BD 95 95 76 94   ....&....Q:...v.
         0010: 77 C9 46 FF ED C0 A0 3D BD                        w.F....=.
   }
}
```

As illustrated in Table 3, an X.509 format represented in the compact format may have a tag (e.g., 0:4:1) that indicates that the following message is a certificate in the compact format. Also, in some embodiments, one or more fields may be omitted from the compact format if the constraints allow only one value for the format. For example, the example compact format certificate has omitted the version field from the values represented in the standardized format, since the field is constrained to version 3. Thus, in other words, if there is only a default value for a field, the field may be omitted from the compact version regardless of whether the field is defined as required for the standardized (e.g., X.509) format. The value may be omitted from the compact format since the value may be restored when the certificate is converted back to the standardized format. In some embodiments, the compact format of the certificate has multiple field tags (e.g., in hexadecimal) that compactly identify the fields based on example values represented in Table 4 below:

TABLE 4

Example tag representations for the compact format of the certificate.

```
kTag_SerialNumber                 = 1,   // [ byte string ] Certificate serial number, in BER
integer encoding.
kTag_SignatureAlgorithm           = 2,   // [ unsigned int ] Enumerated value identifying
the certificate signature algorithm.
kTag_Issuer                       = 3,   // [ path ] The issuer distinguished name of the
certificate.
kTag_NotBefore                    = 4,   // [ unsigned int ] Certificate validity period start
(certificate date format).
kTag_NotAfter                     = 5,   // [ unsigned int ] Certificate validity period end
(certificate date format).
kTag_Subject                      = 6,   // [ path ] The subject distinguished name of the
certificate.
kTag_PublicKeyAlgorithm           = 7,   // [ unsigned int ] Identifies the algorithm with
which the public key can be used.
kTag_EllipticCurveIdentifier      = 8,   // [ unsigned int ] For EC certs, identifies the
elliptic curve used.
kTag_RSAPublicKey                 = 9,   // [ structure ] The RSA public key.
kTag_EllipticCurvePublicKey       = 10,  // [ byte string ] The elliptic curve public key,
in X9.62 encoded format.
kTag_RSASignature                 = 11,  // [ byte string ] The RSA signature for the
certificate.
kTag_ECDSASignature               = 12,  // [ structure ] The ECDSA signature for the
certificate.
// Tags identifying certificate extensions (tag numbers 80 - 255)
kCertificateExtensionTagsStart    = 128,
kTag_AuthorityKeyIdentifier       = 128, // [ structure ] Information about the public
key used to sign the certificate.
kTag_SubjectKeyIdentifier         = 129, // [ structure ] Information about the
certificate's public key.
kTag_KeyUsage                     = 130, // [ structure ]
kTag_BasicConstraints             = 131, // [ structure ]
kTag_ExtendedKeyUsage             = 132, // [ structure ]
kCertificateExtensionTagsEnd      = 255,
// ---- Context-specific Tags for RSAPublicKey Structure ----
kTag_RSAPublicKey_Modulus         = 1,   // [ byte string ] RSA public key modulus, in
ASN.1 integer encoding.
kTag_RSAPublicKey_PublicExponent  = 2,   // [ unsigned int ] RSA public key
exponent.
// ---- Context-specific Tags for ECDSASignature Structure ----
kTag_ECDSASignature_r             = 1,   // [ byte string ] ECDSA r value, in ASN.1
integer encoding.
kTag_ECDSASignature_s             = 2,   // [ byte string ] ECDSA s value, in ASN.1
integer encoding.
// ---- Context-specific Tags for AuthorityKeyIdentifier Structure ----
kTag_AuthorityKeyIdentifier_Critical  = 1, // [ boolean ] True if the
```

TABLE 4-continued

Example tag representations for the compact format of the certificate.

```
AuthorityKeyIdentifier extension is critical, Otherwise absent.
    kTag_AuthorityKeyIdentifier_KeyIdentifier  = 2,   // [ byte string ]
    kTag_AuthorityKeyIdentifier_Issuer         = 3,   // [ path ]
    kTag_AuthorityKeyIdentifier_SerialNumber   = 4,   // [ byte string ]
    // ---- Context-specific Tags for SubjectKeyIdentifier Structure ----
    kTag_SubjectKeyIdentifier_Critical         = 1,   // [ boolean ] True if the SubjectKeyIdentifier
extension is critical. Otherwise absent.
    kTag_SubjectKeyIdentifier_KeyIdentifier    = 2,   // [ byte string ] Unique identifier for
certificate's public key, per RFC5280.
    // ---- Context-specific Tags for KeyUsage Structure ----
    kTag_KeyUsage_Critical                     = 1,   // [ boolean ] True if the KeyUsage extension is
critical. Otherwise absent.
    kTag_KeyUsage_KeyUsage                     = 2,   // [ unsigned int ] Integer containing key
usage bits, per to RFC5280.
    // ---- Context-specific Tags for BasicConstraints Structure ----
    kTag_BasicConstraints_Critical             = 1,   // [ boolean ] True if the BasicConstraints
extension is critical. Otherwise absent.
    kTag_BasicConstraints_IsCA                 = 2,   // [ boolean ] True if the certificate can be used
to verify certificate signatures.
    kTag_BasicConstraints_PathLenConstraint    = 3,   // [ unsigned int ] Maximum number of
subordinate intermediate certificates.
    // ---- Context-specific Tags for ExtendedKeyUsage Structure ----
    kTag_ExtendedKeyUsage_Critical             = 1,   // [ boolean ] True if the ExtendedKeyUsage
extension is critical. Otherwise absent.
    kTag_ExtendedKeyUsage_KeyPurposes          = 2,   // [ array ] Array of enumerated values
giving the purposes for which the public key can be used.
```

As illustrated in Tables 3 and 4, the first field—tagged with a 1—represented in the example compact format of the certificate includes a byte string corresponding to a serial number field that includes a byte string (e.g., 0000: 10 48 CA F2 ED 4F 9B 30) that uniquely identifies the certificate issued by the certificate authority. The second field—tagged with a 2—includes an unsigned integer that corresponds to the signature algorithm (e.g., 4=ECDSA w/SHA-1) used to generate the signature. The third field—the issuer field tagged with a 3—is a path that identifies the issuer of the certificate and the issuer's unique identifier for the certificate. For example, thirteen identifies the issuer as Weave Certificate Authority. The fourth and fifth fields each include unsigned integers that provide the temporal boundaries of validity for the certificate. The sixth field identifies the subject's unique identifier for the certificate. In some embodiments, this field may be a decimal representation of the ID for the corresponding device in the fabric. For example, the subject may be a 64 bit IPv6 compatible identification of the device. The field tagged as "A" corresponds to an encoded version of the public key. Fields tagged with a value of greater than 80 in hexadecimal may correspond to extensions for the certificate. In some embodiments, at least some certificate extensions available for the standardized format may be constrained from the compact format. Finally, the field tagged as "C" corresponds to the signature for the certificate.

By compressing each of the fields using the foregoing translations, an X.509 certificate may be losslessly compressed by about 30-40 percent over a non-compressed certificate. Furthermore, with a clear and well defined mapping between values, the certificate may be readily converted between the two formats for verification. Moreover, by encoding/decoding the fields in the same order between the two formats, the conversion may be done in lock step without using a resorting step before validation.

Returning to FIG. 11, after a field is encoded into the second format, the processing device determines whether all fields have been translated from the first format to the second format (block 530). If not all fields have been converted, the processing device proceeds to the next field (block 532). In some embodiments, after all fields have been converted, the processing device may encode the signature (in the first format) and/or further encode the data encoded in the second format into a single "envelope" that may be used for transmitting the data and/or the signature within the fabric.

Field-by-Field Encoding to Standardized Format

Figure 12:
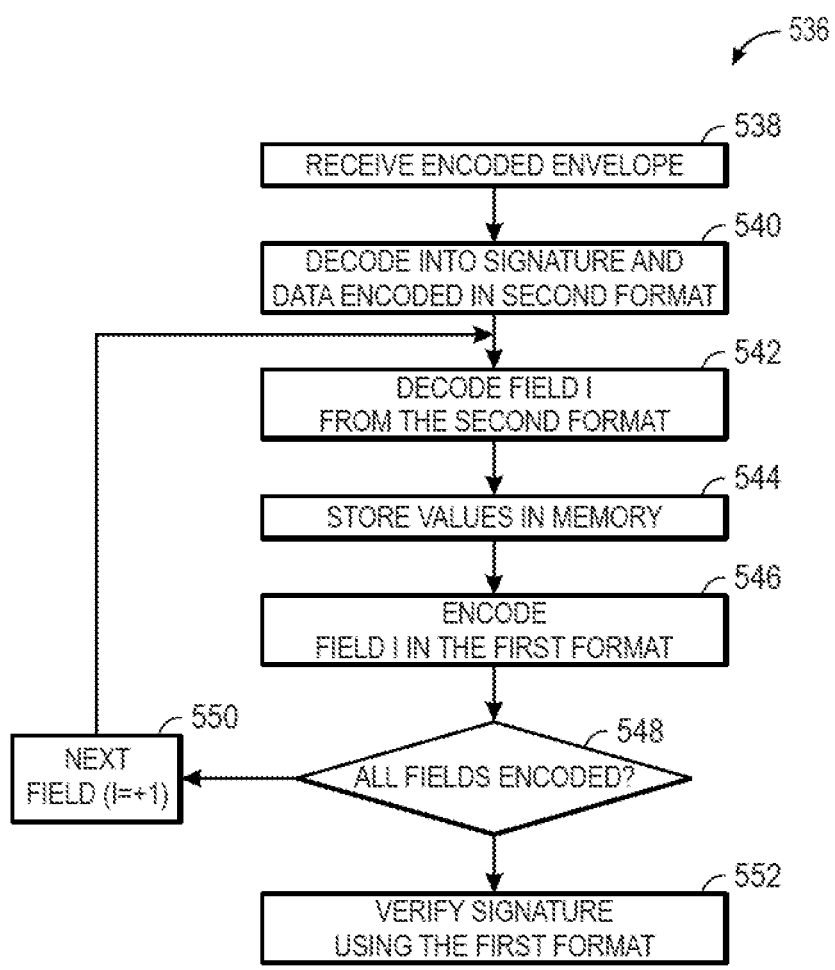
FIG. 12 illustrates a flowchart depicting a process for verifying the compact format of the certificate, according to an embodiment.

FIG. 12 illustrates a process 536 that may be used to convert from the compact format to the standardized format (e.g., for validation). The process 536 may be performed at least partially on a secure environment processing system separate from devices to use the certificates and/or devices that use the certificates. The processing device receives the encoded envelope, such as the message 508 of FIG. 10 (block 538). In embodiments, where the signature and core certificate data are encoded in an envelope, the processing device decodes the envelope into a separate signature and core data portions.

The processing device then decodes a first field of the core data (block 542). For example, the processing device may use a name value pair tagging system similar to the values illustrates in Table 4. The processing device then stores the decoded values in memory (block 544). The stored values are then encoded into the standardized format, such as X.509 using distinguished encoding rules (block 546). The processing device continues decoding, storing, and encoding the values until all fields have been encoded (block 548). If not all fields have been encoded, the processing device proceeds to the next field (block 550). Once all fields have been encoded, one or more devices may verify the signature decoded from the envelope along with the data encoded in the standardized format (block 552).

Although the foregoing discussion generally discusses a standardized format and a compact or compressed format, in some embodiments, the two formats used in the system may be the compact or compressed format along with another format that is designed for higher-bandwidth, is more expansive, or less compact than the compact or compressed format even if the format is not "standardized," such as X.509. Thus, in some embodiments, the certificate may be translated from a higher-bandwidth format to a lower-bandwidth (e.g., compact) format in at least some situations even when the higher-bandwidth format is not formally standardized.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A non-transitory computer-readable medium having stored thereon a certificate in a compact format and instructions configured to cause a processor to authenticate the certificate in the compact format, wherein the certificate comprises a plurality of elements in the following order:
   a top-level tag that indicates that the encoded data is the certificate in the compact format, wherein the top-level tag comprises 0:4:1;
   a serial number field tagged with a tag of 1 in hexadecimal that uniquely identifies the certificate as issued by a certificate authority;
   a signature algorithm field tagged with a tag of 2 in hexadecimal that indicates a type of signature algorithm used to generate the signature;
   an issuer field tagged with a tag of 3 in hexadecimal that includes a path that identifies the issuer for the certificate;
   an encoded version of a public key tagged with a tag of A in hexadecimal; and
   a signature field tagged with a tag of C in hexadecimal, wherein each field includes the respective tags and corresponding values encoded in a tag-length-value (TLV) format, wherein authentication of the certificate is based at least in part on any two of the plurality of elements.

2. The non-transitory computer-readable medium of claim 1, wherein the serial number field comprises a byte string.

3. The non-transitory computer-readable medium of claim 1, wherein the signature algorithm field comprises an unsigned integer that corresponds to the signature algorithm used to generate the signature.

4. The non-transitory, computer-readable medium of claim 3, wherein the unsigned integer corresponds to Elliptical Curve Digital Signature Algorithm (ECDSA) or Rivest-Shamir-Adleman (RSA) algorithm.

5. The non-transitory computer-readable medium of claim 4, wherein an unsigned integer value of 4 corresponds to ECDSA with Secure Hash Algorithm One (SHA-1).

6. The non-transitory computer-readable medium of claim 1, wherein any fields tagged with a value greater than 80 are designated as certificate extensions compatible with X.509 formats.

7. The non-transitory computer-readable medium of claim 1, wherein the compact format does not comprise a version field.

8. An electronic device comprising:
   a power source;
   a memory; and
   a processor, where configured to authenticate a certificate in a compact format, wherein the certificate comprises:
      a serial number field tagged with a tag of 1 in hexadecimal that uniquely identifies the certificate as issued by a certificate authority;
      a signature algorithm field tagged with a tag of 2 in hexadecimal that indicates a type of signature algorithm used to generate the signature;
      an issuer field tagged with a tag of 3 in hexadecimal that includes a path that identifies the issuer for the certificate;
      a subject field that is tagged with a tag of 6 in hexadecimal that indicates a subject's unique identifier for the certificate, wherein the subject field comprises a 64 bit length IPv6 compatible identifier for the subject device;
      an encoded version of a public key tagged with a tag of A in hexadecimal, wherein the subject field is after the issuer field and before the encoded version of the public key; and
      a signature field tagged with a tag of C in hexadecimal, wherein each field includes the respective tags and corresponding values encoded in a tag-length-value (TLV) format.

9. The electronic device of claim 8, wherein the certificate comprises:
   a not before field tagged with a tag of 4 in hexadecimal that indicates a period in time before which the certificate is not valid, wherein the not before field is after the issuer field and before the encoded version of the public key; and
   a not after field tagged with a tag of 5 in hexadecimal that indicates a period in time after which the certificate is no longer valid, wherein the not after field is after the not before field and before the encoded version of the public key.

10. The electronic device of claim 9, wherein the not before field comprises an unsigned integer, and the not after field comprises an unsigned integer.

11. The electronic device of claim 8, wherein the subject field comprises a decimal representation of an identifier for the subject device within a fabric in which the certificate is applied.

12. The electronic device of claim 8, wherein the certificate comprises constraints that blocks some features of a standardized format from which compact format may be translated in a field-by-field order.

13. The electronic device of claim 12, wherein the certificate comprises an order of fields that is common with the standardized format.

14. The electronic device of claim 13, wherein the standardized format comprises X.509.

15. The electronic device of claim 8, wherein the signature algorithm field comprises an unsigned integer.

16. The electronic device of claim 8, wherein the certificate comprises a top-level tag that indicates that the encoded data is the certificate in the compact format, wherein the top-level tag comprises 0:4:1.

17. A method comprising:
   receiving, using an electronic device, a message including a certificate; and
   authenticating the certificate using the electronic device, wherein the certificate includes a plurality of elements as follows:
      a serial number field tagged with a tag of 1 in hexadecimal that uniquely identifies the certificate as issued by a certificate authority;
      a signature algorithm field tagged with a tag of 2 in hexadecimal that indicates a type of signature algorithm used to generate the signature;

an issuer field tagged with a tag of 3 in hexadecimal that includes a path that identifies the issuer for the certificate;

an encoded version of a public key tagged with a tag of A in hexadecimal; and a signature field tagged with a tag of C in hexadecimal, wherein each field includes the respective tags and corresponding values encoded in a tag-length-value (TLV) format; and a top-level tag that indicates that the encoded data is the certificate in the compact format, wherein the top-level tag comprises 0:4:1, wherein authentication of the certificate using the electronic device is based at least in part on any two of the plurality of elements.

18. The method of claim 17, wherein the certificate comprises a field order that is common between the compact format and X.509 formatted certificates.

19. The method of claim 17, wherein the certificate comprises a subject field that is tagged with a tag of 6 in hexadecimal that indicates a subject's unique identifier for the certificate, wherein the subject field is after the issuer field and before the encoded version of the public key, wherein the subject field comprises a 64 bit length IPv6 compatible identifier for the subject device.

* * * * *